(12) United States Patent
    Wical

(10) Patent No.: US 12,579,550 B2
(45) Date of Patent: *Mar. 17, 2026

(54) METHOD AND SYSTEM FOR EMERGENT DATA PROCESSING

(71) Applicant: Transform SR Brands LLC, Hoffman Estates, IL (US)

(72) Inventor: Kelly Joseph Wical, Arlington Heights, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,617

(22) Filed: Jun. 25, 2024

(65) Prior Publication Data

US 2024/0346528 A1    Oct. 17, 2024

Related U.S. Application Data

(63) Continuation of application No. 17/034,045, filed on Sep. 28, 2020, now abandoned, which is a continuation of application No. 13/664,104, filed on Oct. 30, 2012, now Pat. No. 10,803,472.

(51) Int. Cl.
    *G06Q 30/02*    (2023.01)
    *G06Q 50/00*    (2024.01)
(52) U.S. Cl.
    CPC ............. *G06Q 30/02* (2013.01); *G06Q 50/01* (2013.01)
(58) Field of Classification Search
    CPC ................................ G06Q 30/02; G06Q 50/01
    See application file for complete search history.

(56) References Cited

U.S. PATENT DOCUMENTS 5,809,499 A * 9/1998 Wong ...................... G06F 16/30
                                                      706/45
6,049,797 A    4/2000 Guha
6,330,554 B1 * 12/2001 Altschuler ............. G06Q 30/02
                                                      706/21
10,803,472 B2 10/2020 Wical
                (Continued)

OTHER PUBLICATIONS

Int'l Search Report and Written Opinion for PCT/US2013/066429 dated Mar. 28, 2014, 12 pages.

*Primary Examiner* — Chinyere Mpamugo
(74) *Attorney, Agent, or Firm* — McAndrews, Held & Malloy, Ltd.

(57)    ABSTRACT

A method and system for emergent data processing are described. A system having one or more servers operable to handle retail data can receive content including customer data and product data. The content can be normalized and stored into a hyper-graph structure in the servers. The system can be used to select a portion of the hyper-graph structure based on a particular customer and to generate a recommendation for the particular customer based on the content in that portion of the hyper-graph structure. The system can also generate personal catalogs based on the information in the hyper-graph structure. The system can perform competitive analysis between products from different sources and include the results in the recommendations. Moreover, the system can perform a vertical analysis of consumable products to provide recommendations for tools or products that can be used in connection with the consumable products.

34 Claims, 19 Drawing Sheets

(56)                    References Cited

U.S. PATENT DOCUMENTS

| | | | | |
|---|---|---|---|---|
| 2006/0173883 | A1 | 8/2006 | Pierce et al. | |
| 2010/0049770 | A1 | 2/2010 | Ismalon | |
| 2010/0262477 | A1 | 10/2010 | Hillerbrand et al. | |
| 2011/0153451 | A1 | 6/2011 | Bitz et al. | |
| 2012/0150681 | A1 | 6/2012 | Yu et al. | |
| 2012/0203640 | A1* | 8/2012 | Karmarkar ............ | G06F 1/1694 |
| | | | | 705/14.66 |
| 2012/0323729 | A1* | 12/2012 | Kline ................. | G06Q 10/0833 |
| | | | | 705/26.8 |

* cited by examiner

1000

1010

1200

1300

Receive content — 1310

Store content in hyper-graph structure — 1320

Select portion of hyper-graph structure for a particular customer — 1330

Generate a personal catalog for the customer — 1340

1400

METHOD AND SYSTEM FOR EMERGENT DATA PROCESSING

The present application is a continuation of U.S. application Ser. No. 17/034,045 filed Sep. 28, 2020, which is a continuation of U.S. application Ser. No. 13/664,104 filed Oct. 30, 2012 (U.S. Pat. No. 10,803,472). Each of the above-referenced applications is hereby incorporated herein by reference in its entirety.

BACKGROUND

Commercial systems used by retailers and others to perform predictive analytics of customers, products, competitors and other data typically apply techniques such as ontologies, profile classifications, traditional data mining, and simple sales relationships when performing the analysis. These techniques, however, can be limited in their ability to extract and understand complex behavioral and contextual patterns on an individual basis as well as at various groupings of customers and products when used to perform recommendations, personalization, and/or content understanding, for example.

Further limitations and disadvantages of conventional and traditional approaches will become apparent to one of skill in the art, through comparison of such systems with some aspects of the present disclosure as set forth in the remainder of the present application with reference to the drawings.

SUMMARY OF THE DISCLOSURE

A method is provided in which, in a system having at least one server that is operable to handle all types of data such as products, customers, competitor comparisons and general misc content, can be received. The data can be stored into a suitable structure that is able to dynamically connect at various levels of granularity and interpretation, such as a hyper-graph structure in one or more of the servers. A portion of these storage structures can be selected based on a individual pieces of content, such as a customer or a product, and by any type of ad hoc or formal groupings, such as taxonomies, market segments, and latent analytical groups that can be used to generate a recommendation or prediction for any other piece of data (e.g., customers, products, sets of customers or products, latent groups of data).

Another method is provided in which, in a system having at least one server that is operable to handle commercial data, content including customer data, product data and other types of data can be received. The content can be stored into a suitable structure, such as a hyper-graph, in one or more of servers. Any portion of the hyper-graph can be selected (a sub-graph) based on a particular customer, a particular product, or any definable combinations of data in the hyper-graph, and content in the selected portion can be used to generate a new, organized structure, such as a personal catalog of products and related content for a customer.

Another method is provided in which, in a system having at least one server that is operable to handle commercial data, content including customer data, product data and other forms of data can be received. The content can be stored into a suitable structure, such as a hyper-graph, in one or more of the servers. A portion of the hyper-graph can be selected (a sub-graph) based on a particular customer, a particular product, or any definable combinations of data in the hyper-graph, and content in the selection portion can be compared to other structures, or used to find similar sub-graphs within the hyper-graph. Product and other data from different commercial entities stored in one or more of the servers can be compared. Recommendations and predictions for other content (such as a customer, product, or sets of customers or products) can be generated based on content in the selected portion of the hyper-graph and the comparison.

These and other advantages, aspects and novel features of the present disclosure, as well as details of illustrated implementations thereof, will be more fully understood from the following description and drawings.

DETAILED DESCRIPTION

Figure 1:
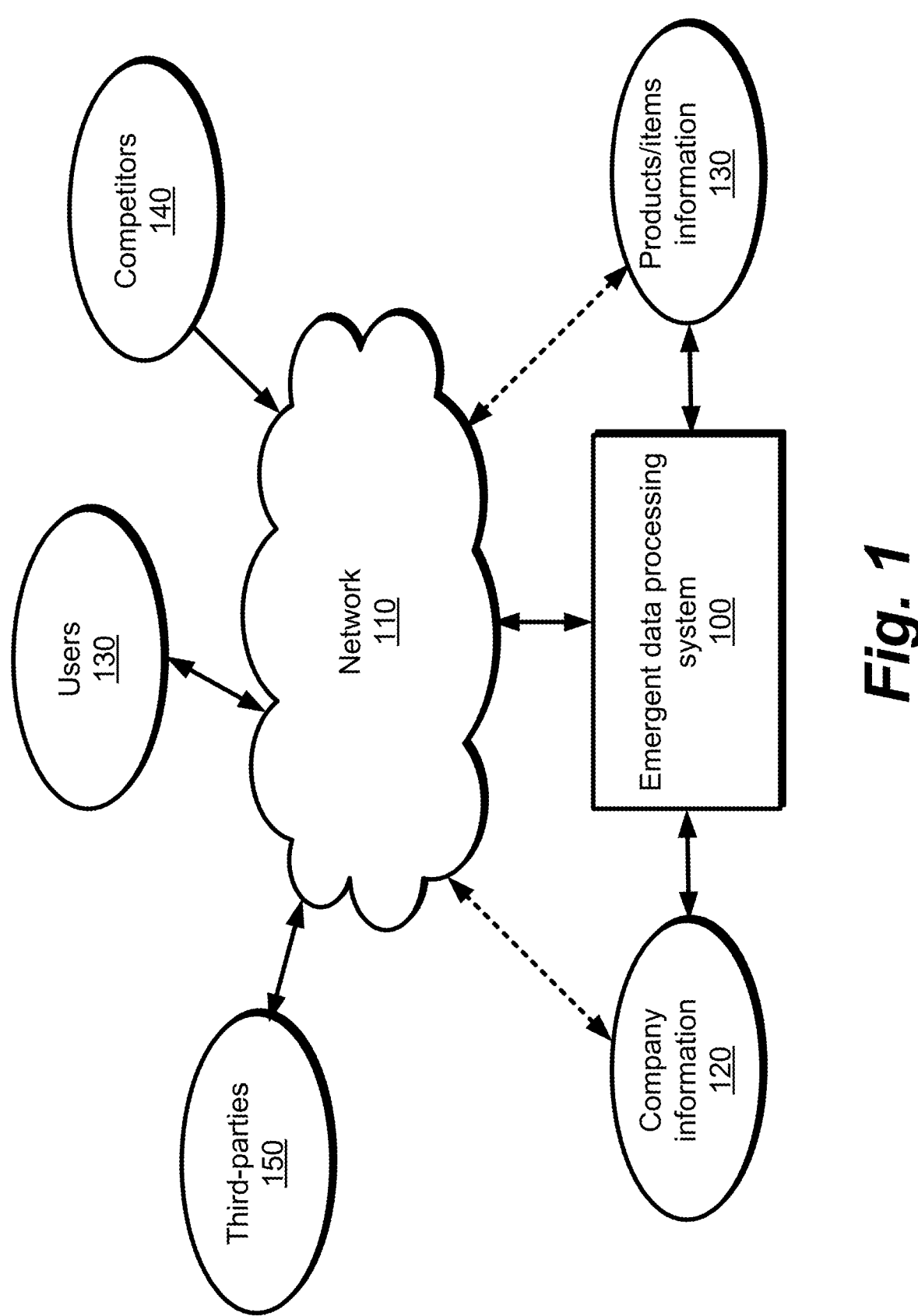
FIG. 1 is a diagram that illustrates an example of a commercial environment having a complex processing system using emergent data.

Certain implementations described in the disclosure relate to a method and system for emergent data processing using complex systems. When compared to other systems, an emergent data processing complex system can provide features that those other systems may not be capable of supporting. The emergent data processing system can provide recommendations and predictions through various means, but not limited to, online, mobile, email, in-store, catalogs, circulars, and direct mail. Moreover, the emergent data processing system can support features such as services, promotions, clubs, agents, dynamic pricing, trending, sentiment, internet sources, quality assessments, and user interface designs. Other features supported include customer satisfaction (CSAT), internal communications, verticals, loss prevention, consumables, parts, activities, subjects, data integration, predictive intentions, time and location, merchant control, marketing control, and finance control. In addition, the emergent data processing system can support offers, deals, advertising, behavior, context, granular crowds, latent networks, social networks, apparel merchandising, appliances parts and services, and fact navigation.

The emergent data processing system, which can also be referred to as the emergent catalog or TEC, uses complex systems to handle emergent data and its processing. Emergent data can refer to data, such as product or customer data, which can dynamically change, evolve, be summarized, re-combined, modified, and/or be adjusted as a result of additional information being considered and/or in response to analysis performed on the data. With respect to the handling of recommendations, predictions, personalization, behavior and content understanding, for example, the emergent data processing system can be based on the notion that the data and its interpretation and use are very complex, elusive to traditional techniques that attempt to interpret a human's point of view or need, and translate this into execution-able data and processes. Accordingly, the emergent data processing system can normalize incoming data into a hyper-graph type (or similar) structure that is sufficient to contain these complex relationships, and can then use various artificial intelligence (AI) and/or reasoning techniques applied to real-word use-cases (e.g., human descriptions and needs) to extract and understand patterns and data based on the graph's persona (e.g., characteristics, interconnections, patterns and interpretations).

The emergent data processing system can be used to provide a deep understanding of any piece of data in the graph, such as a customer, a company's content (e.g., products, offers, deals, supporting collateral), and a competitor's related content. With this understanding, the emergent data processing system can enable application developers to draw out ideas, patterns, predictions, and/or answers to various issues. Application developers are routinely asked to add functionality to retail sites, for example, that would include various kinds of product recommendations on product detail pages, or to remind customers of items they may have forgotten based on what they have in their cart during checkout, or for recommendations that are in the area that a mobile phone user is currently walking through. In addition to recommendations, there are many applications where developers lack the subject-level skills but have the technical skills to augment assortment management systems, pricing comparison systems, loss prevention and fraud control systems, and numerous forms of content management especially in the area of large marketplaces. All of these areas can be easily accessed in the emergent data processing system via its API calls. For any particular customer, for example, more appropriate decisions can be made and/or more appropriate options can be provided based on the context, behavior, events, interests, preferences, and/or activities of the customer. These results can be achieved while concurrently keeping these ideas and predictions relative to the needs and directions of a company's financial goals, marketing and merchandising requirements, and then ensuring that the results are positioned in a favorable way against the company's competitors. These relationships are implemented without attempting to fashion direct links and rules that are not readily possible because of the inherent complexity.

FIG. 1 is a diagram that illustrates an example of a commercial environment having an emergent data processing system. Referring to FIG. 1, there is shown a commercial or retail environment having an emergent data processing system 100, which can also be referred to as the emergent catalog system or TEC, for example. The environment can also include a network 110, users or customers 130, competitors 140, third-parties 150, company information 120, and products/items information 130.

The network 110 enables the various components in the environment to communicate with each other. In one implementation, the company information 120, which can include business or marketing information, for example, can communicate with the emergent data processing system 100 directly and/or through the network 110. Similarly, the products/items information 130, which can include a wide range of product information for a particular retailer or commercial entity, for example, can communicate with the emergent data processing system 100 directly and/or through the network 110.

Users 130 can provide information to the emergent data processing system 100 and/or access information from the emergent data processing system 100 through the network 110. Similarly, the emergent data processing system 100 can obtain information from competitors 140 and/or communicate with third-parties 150 through the network 110.

Because the emergent data processing system 100 uses information from users, customers, competitors and other data types to perform its functions, more detail information for some major data types is provided below in this regard.

Customers

A customer (or other types of data that is traditionally associated with profiles) in the emergent data processing system 100 does not have a static profile. Instead, a customer can be described as a dynamic collection of interconnecting dimensions of data, where each customer can be defined by not only characteristics about that customer, but can also be defined by relative data from other customers. In some instances, a customer can be defined by what he or she is not. A customer in the emergent data processing system 100 can more correctly be characterized by its collection of associated data, such as interests (specifically identified by the customer or inferentially determined), probable activities the customer is engaged in (inferentially determined), specific attributes about a customer, such as marital status, age, number of kids, where they live, all of which can be identified specifically by the customer or inferentially. Each customer also can have a detailed set of behavioral and transactional data associated with them that defines things they do and when. The emergent data processing system 100 is then able to compare all of the customers and find those whose data largely intersects. From this, customers with intersecting data can copy data from one another, filling in missing pieces. This process can extend in more than one dimension, intersecting and copying data from multiple sets of customer-computed segments, weighting the probability accordingly as missing pieces are filled in. In this way, it can be seen that every possible aspect that the emergent data processing system 100 captures and measures can be related to every customer, with some weight scoring how much of each element is likely true for each customer. This can continue to improve for all customers as every new piece of information comes in about any individual customers. It also can be used to determine, based on a customer having a low weight in some elements, what characteristics a customer likely does not have. In this way, a customer has every possible 'persona' or different collection of characteristics. Which persona is active and dominating any interaction is what the emergent data processing system 100 must determine at runtime when the interactions occur.

A customer can be dynamically defined, and the various components or parts that define the customer can be distributed through the hyper-graph type structure as either positive graph points or negative graph points. As such, the emergent data processing system 100 need not use a typical notion of a customer profile. For example, the concept of a customers' profile, when looking to discover the deeper levels of context, behavior, events, characteristics, and/or other features of the customer, becomes valid when interpreted as part of all customers. Thus, the emergent data processing system 100 can be said to have one customer, but that customer has an infinite number of variations depending on the exact context of data at any instant in time.

In the emergent data processing system 100, a customer can be larger than a single unit that is typically thought of as a customer. A customer in the emergent data processing system 100 can have a very large number of personas, each of which can be captured from fragments of an individual context, and then collected together based on shared contexts. As a result, every customer can be the collection of all customers at a point in time for a given context, with the characteristics and predictive behavior extended from all the intersections, not just the individual. Any one instance of a customer can represent proxies of particular cohorts, segments, micro-segments, and collections. A customer in the emergent data processing system 100 can represent an entity for which certain missing information can be filled in or patched from the contextual connections to other customers (e.g., contextual parents).

From the description provided above for a customer in the emergent data processing system 100, the complex characteristics that become available from the dynamic data dimensions, the relative interconnections of the customer dimensions (e.g., what is and what is not the definition of each customer), the large number of semantics variations (e.g., context, behavior, events), and the slices of persona that each customer is made up of, which creates a view of a customer that is otherwise not able to be captured through the typical profile and ontology type approaches. The definition of the customer can be based on the rich expressions of what the customer is doing and how these events intersect with all other customers. The emergent data processing system 100 provides the ability to capture this type of data, and then the ability to use it in many types of applications. An example would be where there are 50 million customers, and they have resolved to a set of 1 million different personas (abstracted collections of context, behavior, interests, activities, and/or other criteria). When interacting with a customer, any one of the 1 million personas is available to help determine what the customer is likely to be doing next (for predictions and recommendations, for example). Clues from real-time searches, navigation, time, location and weather, for example, can be used to determine which of the personas is most like prevailing, and from that identification, any upcoming recommendations and predictions can be slanted towards that prevailing persona.

Competitors

Each piece of content that is loaded or stored into the emergent data processing system 100 can be automatically connected in many dimensions to other content. In some instances, the content from one content source can be connected and can compare itself (e.g., its sub-graph in the hyper-graph) to content from another data source (of similar or dissimilar content). The content can represent products from one retailer connecting and comparing themselves to the same or similar products from one or more additional retailers. Any source or content of any source can be connected and compared to any other source or content of any other source. Comparisons are made using all of the data available from both the competitor and the source company. This will include specific data carried in a product, for example, like title, price, brand, color, description, numerical and technical definitions, packaging, and also include external data that relates to any of the items being compared, such as blogs, reviews, ratings and tagged pictures. In addition, data that is related to the understanding of the content is also used. For example, one product may use a term or an acronym, while the next product uses descriptions of these terms or acronyms. The emergent data processing system 100 can use data that it has learned through associations to these terms, to expend and compare them as they are encountered. In addition, when items are determined to be the same, the characteristics that have been used uniquely from one are then transcribed to the other, making a common definition that can then be used to better understand a third.

When connecting one piece of data to another piece of data, the emergent data processing system 100 can create a type of dynamic data-mart using many dimensions of data as selection criteria. A data-mart may refer to a subset of the data that is being warehoused (a sub-graph) or stored, or to an access layer (e.g., application programming interface or API) that can be used to access the data that is being warehoused or stored. Using the data-mart it may be possible to initially create a pool of items that are likely to connect to the input item. The particular terms from the input item and those of the targeted items need not be relied on in every instance because certain items can be expressed using unique terms. By using many different selection dimensions, the emergent data processing system 100 can substantially guarantee that the items that are to be compared are the ones that are most needed for the comparison. That is, the emergent data processing system 100 may not be affected, as other systems can be, by performance and/or scalability issues because the emergent data processing system 100 need not compare every item to every other item, particularly when in many instances the connections that would be compared tend to provide little to no real value. For example, as an initial selection that would reduce a potential list of competitor items from tens or hundreds of millions of possibilities, one could select (in parallel and results combined) based on brand, technical terms, numbers of a certain size, attribute characteristics, composites of title or description matches at a theme or n-gram level, model number, fuzzy interpretations of model numbers (one has a special character and the other does not, but could still match), gender references, color references, discussion of packaging or refurbishing, bundle identification, and/or accessory identification. These can be done individually and in combination. The results should be a more workable list size of around 50 thousand items, which can then easily be processed in parallel and ranked.

Once the list of comparable items has been selected, the emergent data processing system 100 can compare each item in the target to the input item, in many different dimensions. The comparison can include the computation of a score that represents the degree of overall comparison, as well as individual numbers that represent the degree of comparison along different lines. For example, a comparison line can be how comparable two items are when only technical terminology is used for the comparison.

The emergent data processing system 100 can also compute a large connection of sub-graphs that compare to other sub-graphs, and can provide many metrics that show the semantics of how the sub-graphs compare. This comparison would evaluate both the intersection of one artifact's detailed sub-graph against all others that it connects to, and also compare one artifact's sub-graph to a sub-graph of associations that extend each node of the artifact's sub-graph, and then compare the associations against any target sub-graphs. Thus, an association 'cloud' can be placed in the middle of two sub-graphs, which enable a comparison that is not determined by the exact words or themes involved in either of the two individual sub-graphs. This feature of the emergent data processing system 100 can be useful because for many applications one of the requirements can be to provide a deep understanding of how similar any two items are, where they are similar, and where they are dissimilar.

While the emergent data processing system 100 creates its graph connections, it can create semantic dimensions that measure the assortments of items, that is, those with specific levels of similarity across sources (meaning comparing any collection of items to any and all other collections of items in the graph). The evaluations made can be used to determine characteristics of a source's items, such as price points, measurements of relative content quality or lack of content quality, assortment coverage, and characteristics or attributes about collections of items to, for example, determine the likelihood of items missing certain characteristics or attributes.

The hyper-graph generated by the emergent data processing system 100 can be used to produce price recommendations that can save considerable time and effort in projects that require dynamic pricing based on the competition. Current programs work based on the principle that the source company can provide all the data points and algorithms to best compute what the price should be. The emergent data processing system 100 can perform a much simpler computation based on the ability of the system to very accurately measure the similarity of items to build a comparable assortment—by identifying comparable items in the competitors' information, and then using their prices to determine what the best price points should be. This approach then lets competitors spend their resources (e.g., money, time) on processing and computing the low-level metrics, while the emergent data processing system 100 can use the pricing information from the competitors to determine its own price recommendation points.

Figure 2:
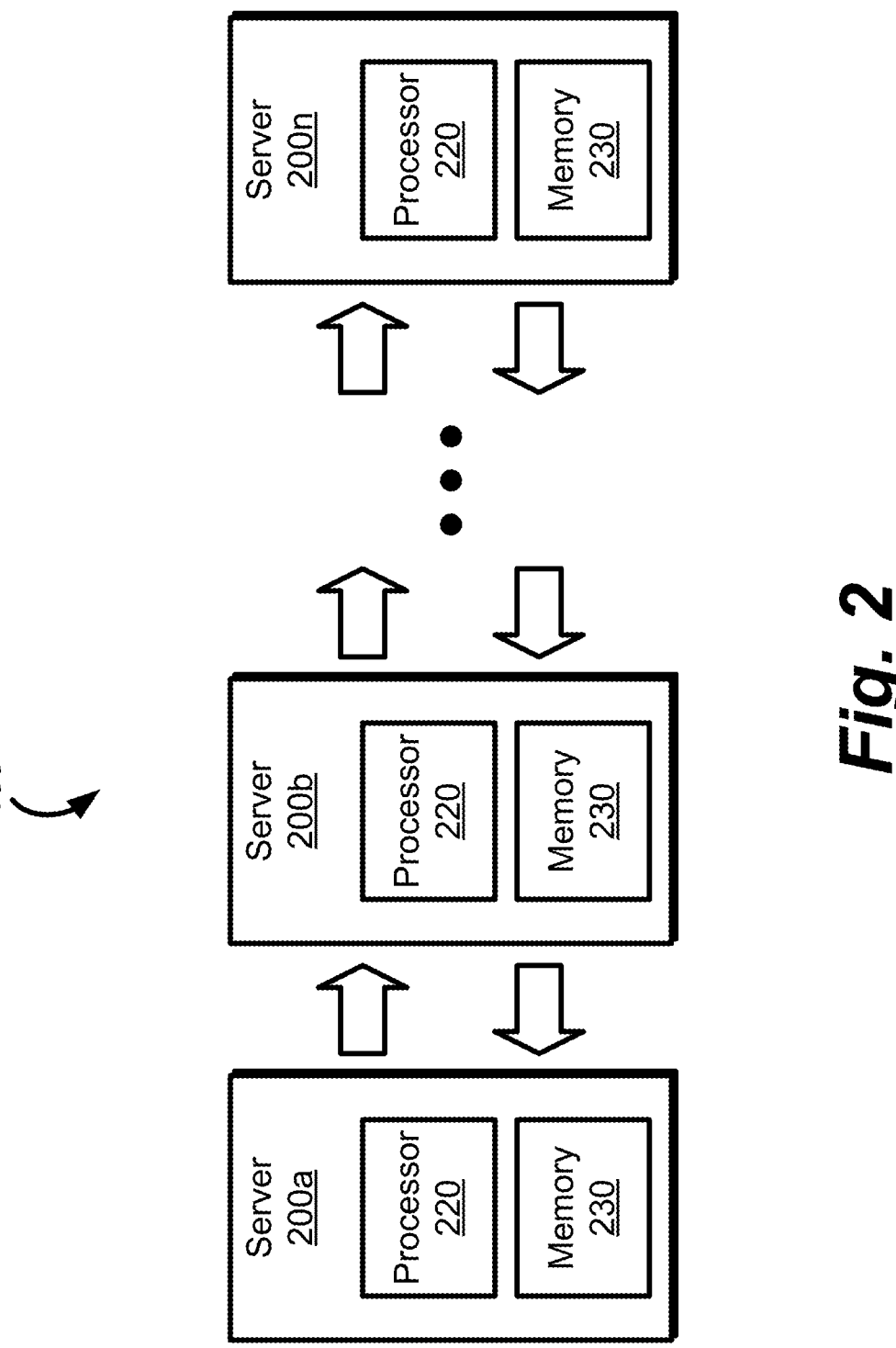
FIG. 2 is a diagram that illustrates an example of a distributed architecture for the emergent data system.

FIG. 2 is a diagram that illustrates an example of a distributed architecture for the emergent data processing system. Referring to FIG. 2, there is shown an implementation of the emergent data processing system 100 of FIG. 1 that is based on a distributed architecture having multiple servers which are able to process requests in parallel. In the example shown in FIG. 2, the emergent data processing system 100 can include servers 200*a*, 200*b*, . . . , 200*n*.

Each of the servers can have a processor 220 that is operable to perform computations, instructions, processes, and/or methods related to the handling of emergent retail or commercial data. The functions performed by the processor 220 can be based on one or more applications that can be executed on a central processing unit (CPU) or similar integrated circuit in the processor 220. The CPU (not shown) can run an operating system on which the one or more applications can be executed.

Each of the servers can also have a memory 230 that is operable to store data and instructions related to the handling of emergent retail or commercial data. The data can include product data, customer data, business data, and/or other type of data received by the emergent data processing system

100. The instructions can include instructions corresponding to software applications or other operations performed by the CPU in the processor 220.

Additional examples of features and/or operations that can be implemented as part of an architecture of the emergent data processing system 100 are provided below.

Architecture

Distributed Semantics

As described above, the emergent data processing system 100 can be implemented as a highly-distributed, parallel processing system. For example, the emergent data processing system 100 can be implemented physically across many servers and/or storage devices. The storage devices can be part of the servers or can be separate from the servers. Moreover, the emergent data processing system 100 can be highly-distributed semantically such that data can be connected, distributed, summarized, normalized, and/or otherwise handled, across many different dimensions, without the notion of database normalization.

Data Integration—The emergent data processing system 100 can normalize incoming data and can connect the incoming data across many dimensions to other related data. The connection of incoming data to the other data can be performed automatically. Incoming data would be from all sources of related data within the company, such as transactional data from different retail areas, data from content management systems or customer service systems, and data from customer maintained profiles. Data can also come from external sources that would be able to be linked to internal data, such as other information about a customer that can be found on the internet and linked based on street address, phone number, and email address. Internet data can also link product data from external reviews, blogs and other sources based on model or universal product code (UPC) numbers, as well as by using the emergent data process system 100 capability to perform 'fuzzy' matching of content. External data can be provided by various license and access methods common to the internet. The emergent data processing system 100 can handle dirty data, that is, data that is incomplete, not well understood, too difficult to connect to other data, out of date with its documentation, and/or changing often. The dirty data can be used by the emergent data processing system 100 to provide solutions and generate results while other system may simply disregard such data. The emergent data processing system can also fill-in missing data based on sub-graph overlays from similar items.

Data Unification—The emergent data processing system 100 can break down the data that is integrated into very low levels and can interconnect the broken-down data in the hyper-graph. By this approach, the data can be considered to be the data itself and need not be defined by external semantics. The emergent data processing system 100 can enable the data to be unified into patterns that can be compared, contrasted and otherwise handled in order to understand the relative significance of any piece of data.

Content Delivery—The emergent data processing system 100 can be operable to break down, normalize, unify, and self-define the data. Nevertheless, the emergent data processing system 100 can also be capable of reconstructing the data in more traditional formats and of delivering the data with new meanings and/or tags to systems that are not suitable to deal with the type of data representations supported by the emergent data processing system (e.g., fuzzy representations). For example, content management system may want to have tags on data that is poorly written, missing important attribute definitions, classified in the wrong taxonomies, or otherwise of note. The emergent data processing system 100 can make these assessments and then update the appropriate areas in the content management system with its determinations, or inform the responsible personnel of changes that it recommends. This can then let the content management system operate in their traditional forms, as opposed to using more complex, fuzzy interpretations of the data via graphs.

Social Networks—The emergent data processing system 100 can represent different types of semantic structures in its hyper-graph, not only of an individual item, but of connections such as social networks. Social networks represent connections between people—friends, experts in a subject, items that people are following, individual recommendations for particular products . . . The network as a whole then can come into play when considering applications such as recommendations, by traversing the networks and measuring semantics and distances from start points. For example, after create a set of recommendations for a particular user based on traditional recommendation techniques (e.g., prior sales), the emergent data processing system 100 can evaluate all of the recommendations against information present in the individual's social network, which may intersect in various ways to the items being recommended. These intersections can then cause an individual recommendation to be increased or decreased in weight. The emergent data processing system 100 can also create its own latent networks, for example of experts in any subject area, groups and their members, social Influencers, users who show followings that depict trust or strong reputations. As an example, a gardening group could list its members, which all possess information about their interests, purchases and activities. This information can then be used to influence recommendations that someone outside the gardening group may need. In the same way, it can be determined who the top people are showing the most interest in gardening, and this can then form a virtual or latent group of people that function in the same way as a specific group would. These networks can be constructed dynamically and can be used, just like manually created social networks, to augment applications or provide specific recommendations based on their characteristics.

Fraud Detection and Loss Prevention—The emergent data processing system 100, because of its ability to integrate disparate, incomplete and otherwise noisy data, can perform multiple functions that enable it to provide utility for loss prevention and fraud detection. For example, the emergent data processing system 100 can identify customers whose overall activity across a wide spectrum of enterprise touch points would suggest common or uncommon behavior. In another example, the emergent data processing system 100 can integrate many different pieces of corporate data (including dirty data) to generate and provide a unified view of the customer that otherwise is not obvious. In these instances, the emergent data processing system 100 can not only base its analysis on traditional data such as sales, but can also include the way the company has been interacting with the customer and how this interaction can be interpreted relative to fraud. Different fraud types would include how layaway purchases are made and paid for, how collusion between marketplace sellers and fraud purchases are identified, how to better determine that a customer is identifiable as a good customer through the integration of more data that relates to that customer but may be outside of the immediate retail need Distributed Customer Data The emergent data processing system 100 can connect data in multiple dimensions and can let an application suggest the data that must be drawn upon and how that data would be dynamically connected and interpreted. This is generally the case when complex use-cases are being implemented, and it is not apparent in advance about how the desired outcome is going to be determined. The application architecture is such that it can review many result sets from existing APIs, based on the input being used by the use case, and determine which APIs are getting the appropriate data returned or as close as possible. Then different manipulations of the data in the API can be used that can produce a more narrow or a more generalized set of results, or cause other variations based on slight input alterations. An aspect is then to narrow down the needed results by expanding and filtering as needed against the results of somewhat related APIs.

Characteristics Interpretation—The emergent data processing system 100 can define personal characteristics and then represent those personal characteristics as a sub-graph or set of sub-graphs in the hyper-graph structure. Personal characteristics include such data points as interests, hobbies, activities, behavioral trends, and relationships to other people based on these characteristics. The emergent data processing system 100 can be capable of fine-tuning definitions that integrate not only the simple surface-level data such as what is supplied in a profile question, but also the use of context and behavior to re-define or augment the characteristics.

Reasoning—The emergent data processing system 100 need not use a reasoning technique because the system itself is a reasoning system that is using the hyper-graph to represent different use-cases, contexts, characteristics, and other features that are used by the emergent data processing system 100 to analyze the data and make decisions, including decisions regarding recommendations, the interpretation of content, an the identification of market segments, to name a few.

Predictions—The emergent data processing system 100 can perform predictions by using a new context (e.g., sub-graph) to relate other items against. The emergent data processing system 100 can rate items against different contexts, can predict the likelihood of the item being part of the targeted context, and can produce a score for the prediction. The rating can be performed automatically for an item and the item can be rated against multiple contexts.

Context—In predictions, the definition of a context (i.e. weather, location, time, event restrictions) can cause the artifacts of the emergent data processing system 100 (e.g., customers, products, patterns) to be processed within that context.

Behavior—The emergent data processing system 100 can handle different types of behaviors. A behavior is a time-oriented set of events that an artifact (e.g., person, product, pattern, event) can participate in, how those events are set as sub-graphs in the hyper-graph, and how the movement and intersection of these sub-graphs can occur with other artifacts or sub-graphs. This flexibility enables the emergent data processing system 100 to use a very rich interpretation of behavior, unlike simpler systems that may use click streams or other types of logs.

Anonymity—The emergent data processing system 100 can break apart a customer into observable micro-segments, where, when all possible micro-segment possibilities (for all customers) are determined, each customer then contains each of these micro-segments (e.g., from 0 to 1). This means that every customer contains the characteristics of every micro-segment (considering that a score of 0 still refers to the customer containing no part of that micro-segment). These micro-segments can then be applied to customers that are unknown (e.g., customers not logged in) based on their behavior, context, and/or content, which could be expressed anonymously through their browse/search type activities. These activities can intersect with many micro-segments, which collectively can form together and be used by the emergent data processing system to identify the most related customer with those specific micro-segments, and use that customer as a proxy for the current action the customer is taking. These steps can continue over time and the results can change in real-time as the emergent data processing system 100 continues to learn more about the customer.

Cohorts—A cohort can correspond to one of the micro-segments of a customer as described above.

Crowd-sourcing—The emergent data processing system 100 can build data that is a summary above the individual customer. This type of data can be referred to as crowd-sourced data, for example. It can be produced at the cohort/micro-segment level. The emergent data processing system can continue to accumulate crowd-sourced data using combinations of cohorts, cohorts mixed with other data types such as networks, networks on their own. The crowd-sourced data can be a summary at a level above these other types of data. The crowd-sourced data can be used by the emergent data processing system 100 to perform prediction routines, where the level of inclusion of any customer into a crowd-sourced data definition can carry forth the characteristics of the other customers that intersected that same crowd-sourced data.

Segmentation and Micro-Segmentation—As described above, the emergent data processing system 100 can perform segmentation and micro-segmentation in connection with anonymity, cohorts, and/or crowd-sourcing, for example.

Latent Networks—As described above, the emergent data processing system 100 can perform various functions and/or operations for latent networks such as social networks, for example.

Targeting—The emergent data processing system 100 can perform functions to target customers based on a very detailed, bottom-up understanding of many aspects of the customer, and how they relate to the needs of the business as expressed in offers, deals, ads, and the like. The emergent data processing system 100 can use the instructions or guidance provided by a business (e.g., guidance of how often to contact a customer, the importance of acquiring a new customer in view of revenue or margin) and can make determinations of what is the best marketing campaign given the current context should be.

Events—In the emergent data processing system 100, events can refer to any activity that happens in the system that can be related to a time. The emergent data processing system 100 can take the events and then relate and intersect them throughout the hyper-graph, which can bring the information and content in the graph into any interpretation of any event. The emergent data processing system 100 can fill most missing information in an event by using probability measurements—finding similar event sections in other events that match a context and micro-segments, and fill in the missing data from that similar event data.

Triggers—The emergent data processing system 100 can be operable to enable triggers. Triggers can refer to the ability for marketing, merchandising, finance, or some other organization within a company to use the emergent data processing system 100 to create the expectation of an event and a context, and what to do when the system sees a customer whose actions match the trigger. This allows for a more one-on-one type communication with the customer (or automated connections of communications-like behavior between any two pieces of data), as the specifics of who the customer is, what the customer is doing, and/or the current context surrounding the actions, can be defined with specificity, which allows for messaging that is generated by the emergent data processing system 100 in connection with a trigger to also be specific. For example, a trigger could be set so that if any query that a customer performs contains fishing poles in the result set, and if a specified time of year, location and/or weather pattern is also present, then the system could return data based on ice fishing.

Actions—The emergent data processing system 100 can be operable to enable actions, which are similar to events. But unlike an event, which can refer to the recording of the customer's clicks and other behavior in the system, actions can be designed to be expressions (e.g., twitter) that state something external that a user is doing, which leads to more connections in the hype-graph, which can later have an effect on recommendations made in connection with a customer. So if a customer tweets something about going on a vacation to Mexico, any subsequent interactions with that customer in the retail system could be weighted towards Mexico and vacations, without the customer specifically asking for that.

Subjects, Topics, Themes and Activities—In the emergent data processing system 100, each event or action of a customer can be part of a collection of sub-graphs that are used by the system to predict the intended activity behind the event. These activities can be summarized to determine the probable intended subject area. For example, various events around telescopes may yield an activity around how to build your own telescope, which could then connect to subjects such as astronomy and mirror polishing. Lower levels of the activities can also be expressed in topics and themes, which are progressively more detailed breakdowns of the activity. These more detailed breakdowns of the activity can then be part of the connection to latent networks, where experts and other designations of users can be computed for different activities, subjects, themes and topics. These computations can be built by specifying a context, using various algorithms to determine the set of customers that are a best match to that context, and then determining what subjects, topics, themes and activities those customers are also interested in.

Distributed and Dynamic Content

The emergent data processing system 100 can be operable to compute, assemble, disassemble, and/or generate content in multiple forms. Below are described some examples of the content handling features that can be supported by the emergent data processing system 100.

Personal Catalog—The emergent data processing system 100 can generate a personal catalog from the information and structure of the hyper-graph. The catalog can be a set of sub-graphs from the hyper-graph that are connected together in a visual format. The sub-graphs can be of any data dimension, such as personal information about a customer, how that information intersects with current 'hot' products, which of those products are best positioned from price against the competitors, and which of these products have not been purchased by the customer, and which similar customers have purchased these products at this time of the year. All of these functions are represented by sub-graphs that are overlaid and a unified catalog created from them. Also, existing data, such as an email marketing campaign that is sent can be automatically turned by the emergent data processing system 100 into a personal catalog and expanded or extended through various sub-graphs. In some instances, a specific aspect of a customer, such as their interest in astronomy, can be formed into a personal catalog. Moreover, a larger portion of what is known about a customer can be formed into an expansive 'master' catalog for that customer. In addition, the catalogs that are generated for a customer can be connected together into a catalog collection, making it easy for the customer to find individual catalogs by type or date. This connection of catalogs can be made automatically by the emergent data processing system 100. Examples of personal catalogs are described below with respect to FIGS. 6-7C.

Opportunities—Opportunities are specific types of catalogs that can be generated by the emergent data processing system 100. These types of catalogs can be produced based on context, behavior, message, and/or offers. Context can refer to the conditions that may be needed for the catalog to be activated. Behavior can refer to the actions or events the customer may need to do for the catalog to be activated. Message can refer to what a marketing organization wants to specifically say to the customer in the given context and behavior. The message information can be provided to the emergent data processing system 100 by the marketing organization for handling. Offers can refer to that which the customer is to obtain or receive once the context and behavior are valid and the message delivered referencing that offer. The emergent data processing system 100 can perform the validation of the context and/or of the behavior. For example, the emergent data processing system 100 can check that the necessary conditions, actions, or events have been met to activate the context and/or the behavior.

Dynamic Emails—The emergent data processing system 100 can provide a real-time method for asking for various types of recommendations, delivered when the customer actually opens the email (instead of actually computing the email content and then sending it, dynamic emails send the email header, and the body is computed in real-time only when the customer opens the email. In this manner, the emergent data processing system 100 can enable marketing to move much quicker in designs and eliminates many steps that it normally takes if a variable email is to be pre-computed. Examples of improvements in the steps:

Creating custom images
  Manually loading images into the email
  Manually configuring text
  Approving each offer and the creative for each offer for every email.
  Huge savings when multiple changes were made to offers often requiring reformat of the offers each time.

Localization—The emergent data processing system 100 can generate recommendations that are based on regions, areas, and/or closest stores, for example. These regional or location-based recommendations can be pre-defined (e.g., a particular store) and/or can be created based on a particular campaign (e.g., define an area that is specific to the campaign).

Bundles—The emergent data processing system 100 can compute generic and personalized bundles of recommendations in many different formats. Examples of formats include, but need not be limited to similar items, bundled together purchases, bundles based on subjects, topics, and/or activities, and bundles based on expected future purchases targeted to specific dates. The emergent data processing system 100 can compute the bundles based on current needs or based on predicted needs at a particular point in time.

Search—The emergent data processing system 100 can support numerous methods (e.g., algorithms) for enhancing search results. These methods can range from crowd-sourcing to being oriented around a subject or activity, or very personalized to the individual. This allows for the construction of customized searching in many different ways. For example, a traditional search for polo shirts may list the shirts based on general purchase statistics. An enhanced version of that search could factor in the current customers favorite color or brand, causing those items to rank higher.

Browse—The emergent data processing system 100 can enhance the results from browsing in a similar manner as with the searches described above. In a typical retail web site, products are often listed under a taxonomy, allowing the customer to browse from the top to the bottom by selecting an item from each level that refines the set of possible products. As in search, the listing of the taxonomy elements can be made in an order that is more probably of interest to the individual customer, and the product results can be sorted based on personal information, such as color and brand preferences.

Accessories, Add-ons, Interests, Ideas—The emergent data processing system 100 can support and perform different types of analysis and/or interpretations of any graph point in the hyper-graph. For example, from the point of an individual product, the emergent data processing system 100 can determine or identify accessories, add-on products, replacement or upgrade products, interesting product ideas based on the product, or new ideas for products based on that product, to name a few. So if the customer purchased a television, the emergent data processing system 100 could display a set of accessory items for the television, such as a DVR, cables and a wall mount. A combination of sales information, price, and content definition would be used to determine the set of accessories.

Promotional Interaction—The emergent data processing system 100 can be operable to evaluate different types of activity between a customer and a company. These evaluations can be based on other personal and cohort information. Once an evaluation is performed, the emergent data processing system 100 can determine the next communication step between the company and the customer. This approach differs from traditional promotional campaigns that work by primarily creating the campaign and then trying to determine which customers best fit the campaign. The customer-centric method supported by the emergent data processing system 100 can determine promotional information that is best suited for a particular customer by providing meaningful opportunities for that customer as opposed to just offering any type of discount to the customer on products or items that may be of limited interest to that customer.

Associations—The emergent data processing system 100 can continuously and/or repeatedly learn how to understand and interpret the data in its hyper-graph. An approach to enable such understanding is through the computation and use of associations. Associations can refer to sub-graphs that can be dynamically formed around an activity, a subject, a person, a product, a topic, a word, or the like. These sub-graphs can then be compared, contrasted and interpreted relative to its place in the hyper-graph overall, and provide the intelligence that the emergent data processing system 100 uses to make its decisions.

Recommendation Formula—The emergent data processing system 100 can implement, perform, and utilize a personalized formula for its decisions (e.g., recommendations). The formula can apply to different types of content and not just products. An example of a personalized formula is described below with respect to FIG. 5. There are two general characteristics of the data that can be used with the formula to support a large number of different types of recommendations: similarity and semantic connections.

Similarity can refer to the ability of the emergent data processing system 100 to measure the similarity or likeness between any two items as a relevant part to its decision making. Using this technique, an artifact of any type in the emergent data processing system 100 can be connected and rated against any other artifact. Unlike other systems that work by matching specific pieces of information such as a UPC code or a manufacturer model number, the emergent data processing system 100 works be reading, evaluating and comparing the detail data used in describing any piece of content. In addition, different sources of the same content often describe the item differently, and the emergent data processing system 100 can link these together and use their collective data as a definition. Many different dimensions of the data are computed and their sub-graphs compared. This would include the theme of the data, its technical level of wording, use of numbers and proper names, specific items such as color, brand, and if the item is refurbished, and other similar measurements. Each measurement consists of a score measuring its total amount of data of that type, and then another score that rates the intersection of both artifacts for each element measured.

Unlike similarity, which can be computed through the characteristics of any content item, semantic connections can refer to connections between two items that are not based on similarity. For example, a television that is connected to a television stand or to a video cable. The connection in this example is not one of similarity but one of use. The emergent data processing system 100 can be operable to look for and use any type of connection between data items, which enables the system to provide a richer understanding of the items.

Feedback And Learning—The emergent data processing system 100 can receive, produce, and analyze feedback. For example, the emergent data processing system 100 can learn whenever it makes some type of decision or recommendation that can result in a user providing feedback. An example of this type of learning can occur when a recommendation is sent as an email to a customer, who in turn opens the email and clicks on a product shown in the email, reinforcing the connection of product to customer and cohort in the given context of how the email was sent. The emergent data processing system 100 can analyze this response and raise the importance of similar recommendations to other customers. When the customer opens an email and doesn't click on any of the products shown, the emergent data processing system 100 can lower the importance of those products to similar customers. An example of the use of feedback in the emergent data processing system 100 is described below with respect to FIG. 8.

Finance, Marketing, and Merchandising Integration—Different parts of the business can introduce strategic goals into the emergent data processing system 100. Those goals can play a part in the decision making of the emergent data processing system 100 (e.g., recommendations). For example, finance could indicate that they are interested in margin, or maybe new customer acquisition. Marketing could indicate that they are interested in getting people to open emails better. Merchandising could indicate that they are interested in promoting apparel whenever possible. These kinds of goals can be set into the emergent data processing system 100 and can be used to affect the decisions made. The emergent data processing system 100 need not blindly follow these goals, but can take situations when the decision point can easily go in multiple directions and use these goals to arbitrate the selection. Goals can be set at many levels of granularity, like specific to an individual item in a specific context (such as an area of the country, time of year, type of weather), or very generally defined abstractions. Goals can use context, behavior (what actions or events should be taking place), corporate information (margins, shipping costs, various sales, deals, campaigns in play) and any content (i.e. product collateral) to describe the characteristics of the goal and how, when and where it should execute. Goals can also be expressed both positively (must have some characteristic) and negatively (should not have some characteristic).

Assortment Management—The emergent data processing system 100 can analyze and review a company's products relative to a competitor and their similar products, comparing individual pricing, quality of the content written about the products, and overall assortment advantages and disadvantages. The emergent data processing system 100 can perform the analysis and review automatically. Moreover, the emergent data processing system 100 can use this information when making recommendations and other decisions in order to position the company's offerings in a favorable light to the customer and the company.

Backtracking of Context—The emergent data processing system 100 can analyze a user event (e.g., clicking on a category, doing a search) and go backwards in time to a previous event to record that this was the next sequential event. The emergent data processing system 100 can record the event back all the way to a new search, where the search had no thematic connection to the previous search or browse. The emergent data processing system 100 can indicate the probability of a new context starting. This can produce a path that shows the probabilities of the user progressing in a particular direction based on the user's context and cohort or crowdsourced-related contexts. The paths can be accumulated individually based on context, which includes thematic definitions of the user as well as the current general context of weather, location, and/or time, for example. In addition to browser and search type events, financial tracking can also used, recording order amounts when an order is made. This can result in a higher follow-rate than other events, since the path is one that eventually resulted in a sale. So for example, a customer does various search and browse activities while on a site shopping, and some eventually end if a purchase. When the purchase is made, the trail of activities that the customer went through can be recorded. Then, when new customers show a similar type of activity, they can be guided in the results based on the greatest likelihood to reach the purchase point, based on what the successful purchase did.

Reasoning Process—The emergent data processing system 100 can perform different types of processes or techniques in connection with data handling. For example, the emergent data processing system 100 can use query agents, complex system type agents (discover top catalogs aka DTC), emergent result agents (data expansion catalogs aka DEC), bundle creation and selection, predictions, targeting, and patterns. The different agents allow for many types of processing to be performed on data, recursively, and eventually emerging with a set of results. The results are then normalized for consistent and relative-corrected output.

The emergent data processing system 100 can implement and use a complex system management system, which in turn can implement one or more agents or independent processing techniques. Agents are typically given general directives but not specific instructions. The results of functions performed by the agents are eventually normalized and combined, and any issues can be patched in the agents by abstracting and generalizing the specific issue. The process can use feedback processing because some results can be circular. For example, one agent could be build that does nothing more than try to locate any items that have the similar brand as an input item, but are more expensive. This agent could call other APIs (agents) that return results, and filter out any that do not meet its requirements. In this way, as new agents are built, they continue to find new ways of locating the requested items for this agent, The DTC can be a complex system agent that is widely used in the emergent data processing system 100. The DTC can use the results of other agents (e.g., agents that are primarily query-oriented) to determine the best or most appropriate catalogs (collections of artifacts) with which they intersect. This can be a multi-level (e.g., 3-level) recursive process that can result in a set of catalogs and whatever artifacts are contained under them, where the best catalogs representing the emergent value of the agents are returned.

The DEC can take the catalog results from the DTC and can expand them (recursively if needed) and can intersect the results, proving a selection of artifacts that best represent the emergent nature of the catalogs. These artifacts can be of any of the type of artifacts that are typically placed inside the catalog (e.g., products, images, videos, news stories, reviews). These are then combined with the results from the other agents and can become the final set of results returned at the middle processing agent layer.

Customers and products can come together based on bundle creation and selection supported by the emergent data processing system 100. The data in the emergent data processing system 100 that is related to a customer can be used to determine the areas of interest for a customer, then to determine a selection of the main products, and finally to create a bundle of associated products to the main products for a given context or purpose. For example, a customer may have browsed on a product page about a particular polo shirt. From this, it could be determined that the customer has interests in polo shirts, of a particular brand and potentially a particular size and color. Then bundles can be created that would first select a polo shirt, and then other products that go along with polo shirts. The other products could also filter by color, brand and size if it applied. There can be many different bundle formula types, such as bundles that are all based on a particular interest showing different alternatives, or bundles that focus on a specific item and accessories that go along with that item, or bundles that focus on a specific item and then other items that are eventually purchased over a longer period of time by other customers who both the focus item. Later, when a campaign or some process in the emergent data processing system 100 needs recommendations for a customer, the select bundle process can be called, which can evaluate the customer data and their bundles, and can determine the best fit for the request.

The emergent data processing system 100 can use many different methods (e.g., algorithms) to assess customers, products, context, and behavior, for example, to make new assessments in the form of predictions, targets and patterns. For predictions, the emergent data processing system 100 can use cause/effect type algorithms to determine that based on some past behavior a certain future behavior is expected (e.g., the purchase of certain products based on prior purchases). For targeting, the emergent data processing system 100 can use a desired or preferred goal (i.e. marketing goals or finance goals) to compute the context and behavior that would best yield that goal, delivering the context, behavior, products, logic and customers. Moreover, with respect to patterns, the emergent data processing system 100 can compute a generalized view of probable purchases using various inferences against cohorts (e.g., micro-segments).

Content

The emergent data processing system 100 can use different types of content, from different types of sources. In many instances, the emergent data processing system 100 need not understand the data and how it could be used. The emergent data processing system 100 can handle data, even data that it may not fully understand, by expressing the relationships between data. For example, a field in the product data could be called "code". "Code" may not have any definitions, as they were lost or poorly understood because of alterations over time. However, the understanding of Code can still be made based on the other data elements that it connects to—since all artifacts of the same code would have a shared connection on code, and also possibly on other aspects such as color or size. It could algorithmically be determined that code may function in some relationship in these items similar to size, such as weight. APIs could be constructed that test this Code data because it helps filter out other unwanted items. These relationships can correspond to data inside each individual piece of content as well as how and where the content connects to other pieces of content. Even when a particular piece of data is not fully understood or fully defined, the emergent data processing system 100 can use of complex systems and emergence to search out and take advantage of the existence of any known data that can show a connection to something that is being searched for. This same approach can be used when considering negative positions, that is, when something is being defined by what it is not. The more data that the emergent data processing system 100 is able to obtain, handle, and connect, the more the understanding of the data can increasingly improve, which could provide more effective results in areas such as recommendations, personalization, and content understanding. As an example, additional data can provide clarification in determining what something is not. The inherent noise that exists in data (undocumented fields, data in documented fields that does not match the documentation, data that is understood but without any particular direct need), particularly in ill-defined and not well understood data, may not be an issue in the emergent data processing system 100 because such noise can be used as a source for determining what something is not.

The emergent data processing system 100 can place data or content into a graph (e.g., a hyper-graph type structure) by working with the original data in its standard form as provided by its source. Examples of a hyper-graph and adding content to one are described below with respect to FIGS. 3A and 3B. The emergent data processing system 100 need not have the data altered or modified into some type of format that may be found more useable because such alteration is often not required or desired. For example, a product may have specific dimensions defined. These dimensions do not need to be made into specific database columns. They can just be stored in the graph with semantic tags that define what is known about them. Graph traversals can determine what to do with the data on a use-case basis. Moreover, when the data is altered or modified in some way, it typically means that some compromise in the data has taken place. Instead, the emergent data processing system 100 can take the original data and can determine how it can be placed into the graph without loss of complex characteristics that may be captured in the data. Concurrently with the placement, the emergent data processing system 100 can normalize the data so that any application using the data need not have to deal with many pieces of data in many different formats. The normalization allows the emergent data processing system 100 to unify all the data types and sources, along with their complex expressions of what they are and are not, into a single hyper-graph structure that can then be easily and uniformly accessed.

The data that is handled by the emergent data processing system 100 can have some ambiguity. The ambiguity can be semantic (e.g., like how the word 'bank' can be used in a particular piece of content). The ambiguity can also concern factual understanding of the content. For example, there can be factual ambiguity when not everything about the content is explicitly expressed but rather assumed to be understood. Both the semantic and factual understanding of the content in the emergent data processing system is part of the connecting and disambiguation processes that can take place automatically on the integrated data, by interconnecting the sub-graphs of every word, in its context of the overall theme of the artifact, to the sub-graphs of other words in a context, which makes the semantic connection and eliminates or reduces the probability of ambiguity.

The emergent data processing system 100 can perform data disambiguation with respect to at least four different areas: semantic similarity, semantic attributes, semantic relativity, and user interpretation. With respect to semantic similarity, a general set of associations of data can be computed that show how one term's characteristics intersect with another term's characteristics (e.g., how much of a synonym is one word to another, based on a weighted system that show the number and strength of connections as well as the absence of other expected connections). For semantic attributes, one or more terms can be considered to analyze and determine the associations that best define how the term(s) are characterized (e.g., what are the characteristics of a lawnmower).

With respect to semantic relativity, the emergent data processing system 100 can measure the relative positions in the hyper-graph structure of a sub-graph that represents some object, such as a product, review, user . . . An object can be any node in the graph. Moreover, from the perspective of the hyper-graph, an object can include any collection of nodes and edges in the graph as well as being a single node in the graph.

For user interpretation, the emergent data processing system 100 can perform semantic similarity, semantic attributes, and/or semantic relativity but filtered specifically by what a user (e.g., any node in the graph) is interacting with. This area can be considered as a level of semantic understanding and disambiguation that is specific to another dimension like a user, instead of being relative to the semantic structure of the content itself.

The content that enters the emergent data processing system 100 can be measured relative to other content that is classified by their contributors, for example products submitted by a particular seller, and classified under a particular taxonomy. Patterns of classification can be computed, and outliers can then be assessed against their classes to determine whether any item (e.g., product, review, image) is likely to have been misclassified (e.g., inappropriate to a class) or ambiguously classified (e.g., falls across a number of classes), the latter of which could indicate that there is a topological error in the actual classifications or that an item that is too broadly defined. For each item, the emergent data processing system 100 can provide recommendations that suggest where it may be more appropriately classified. One characteristic about this feature of the emergent data processing system 100 is that it can determine the classifications based on actual intersections of the items that make up each class and not against a definition of the class. Therefore, the emergent data processing system 100 can determine the correct or most appropriate classification of an item, or when there is ambiguity in the definition of the classes for an item.

In addition to assessing the patterns of classifications or collections of items in the hyper-graph, the emergent data processing system 100 can interconnect the patterns from different sources. This allows for an additional dimension of data to show where items from one source (e.g., EBay) can be connected with items from other sources (e.g., Amazon, YouTube). Any type of pattern representing any type of content can be interconnected, as each pattern is itself a sub-graph, which is a node. And every node can be connected to any other node via an edge, and the edges are defined semantically, so any kind of connection between any two nodes is possible.

The emergent data processing system 100 can also operate as an intelligent delivery system for content. Once a set of data has been loaded into the emergent data processing system 100, multiple automated processes can take over to evaluate, classify, route, combine and otherwise create views in many dimensions of the data. The emergent data processing system 100 can then use its delivery mechanisms, such as web recommendations, mobile recommendations, email recommendations, and personal catalogs, to name a few, to call out new sets of data that may be of interest to a user, or to augment and improve a set of data that is being provided or shown to the user. The default operations of the emergent data processing system 100 can follow the notion that the system is a single, dynamic, integrated system that can automatically attempt to improve its understanding of the data unless it is otherwise instructed not to do so.

Every item that is integrated into the emergent data processing system 100 can be compared against any or all other items in the system, showing its relative position to the other items with respect to measurements such as quality, theme, content value, sentiment, contribution level, and the like.

The emergent data processing system 100 can create various summaries for each item that is integrated. These summaries can be event oriented and/or content oriented. Event oriented summaries can be based on the actions of data types such as users. For example, the basis of an event oriented summary can be the likelihood of a user to purchase at higher or lower price points or be interested in specific brands or quality of products. Content oriented summaries can be based on the quality or general relative position of items. For example, the basis of a content oriented summary can be the price points of an item relative to similar items or the quality rating of a brand relative to similar brands.

The emergent data processing system 100 can select and use connected networks (e.g., sub-graphs) of content. This capability can be used in various areas, such as: the use of social networks to influence the graphs the networks are interconnecting with, and the use of latent networks, constructed automatically by the emergent data processing system 100, to compute network characteristics that are presenting themselves indirectly. Social networks influence the graph by allowing the characteristics and attributes of one person in the network to be added to or increased in importance to the other people in the network, and to produce specific recommendations that are for example restricted to the other people in a shared network. Examples of latent networks include interest networks, influencer networks, trust networks, and reputation networks. These networks, unlike social networks that are specifically formed manually by the user, are computed versions based on interests, where the top N users that have the specific interests (for example 10) are used to form the network. Interests are tracked per user, and a latent network can then be produced based on any definition, which is called an interest network. In addition, by tracking other data, such as the number of people following a particular person, a trust network can be formed. Then, if the user being followed is writing his or her content, a reputation network can be formed. An influencer network can be formed based on the purchases made that match the collective purchases in an interest network.

Figure 3A:
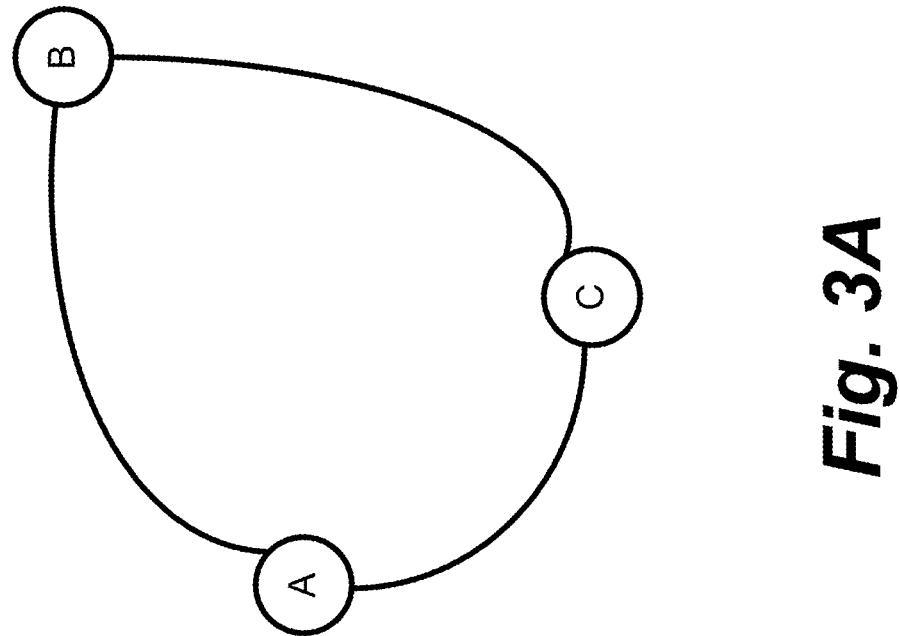
FIGS. 3A and 3B are each a diagram that illustrates an example of a hyper-graph that is used for handling content in the emergent data system.
Figure 3B:
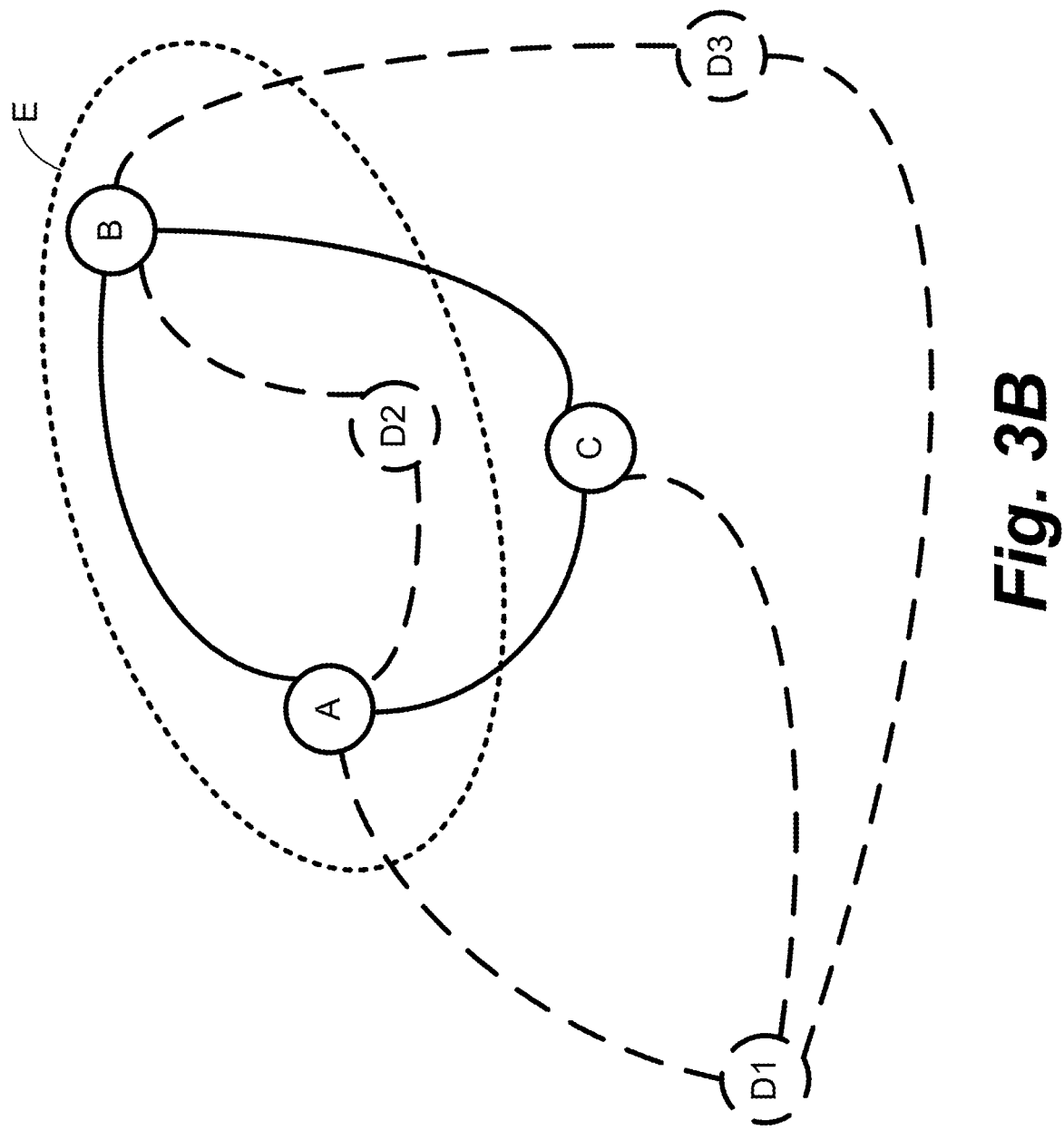

FIGS. 3A and 3B are each a diagram that illustrates an example of a hyper-graph that is used for handling content in the emergent data processing system. Referring to FIG. 3A, there is shown an example of a portion of a hyper-graph structure that is used by the emergent data processing system 100 to handle content. The portion shown includes three nodes (A, B, and C) and three edges connecting the nodes. The nodes can represent content (at any granularity level) such as customers, users, products, items, themes, catalogs, collections, sub-graphs, or the like, while the edges can represent the relationships that exist between the nodes.

Referring to FIG. 3B, the emergent data processing system 100 can receive content, can analyze and process the content, and can then introduce the content into the existing hyper-graph structure. The emergent data processing system 100 can identify the relationship between the content and can determine how to introduce the content into the existing hyper-graph structure. For example, FIG. 3B shows additional nodes D1, D2, and D3, and corresponding edges between node D1 and nodes A and C, between node D2 and nodes A and B, and between node D3 and nodes D1 and B.

FIGS. 3A and 3B are presented by way of illustration and not of limitation. These figures provide an example of how to the emergent data processing system 100 creates a hyper-graph structure with the content it receives rather than using a typical field-based data warehousing approach that is generally applied by other systems. Moreover, the examples shown in FIGS. 3A and 3B illustrate a small hyper-graph structure with few dimensions. The hyper-graph structure can be considerably larger than the one illustrated, having a large number of dimensions.

Figure 4:
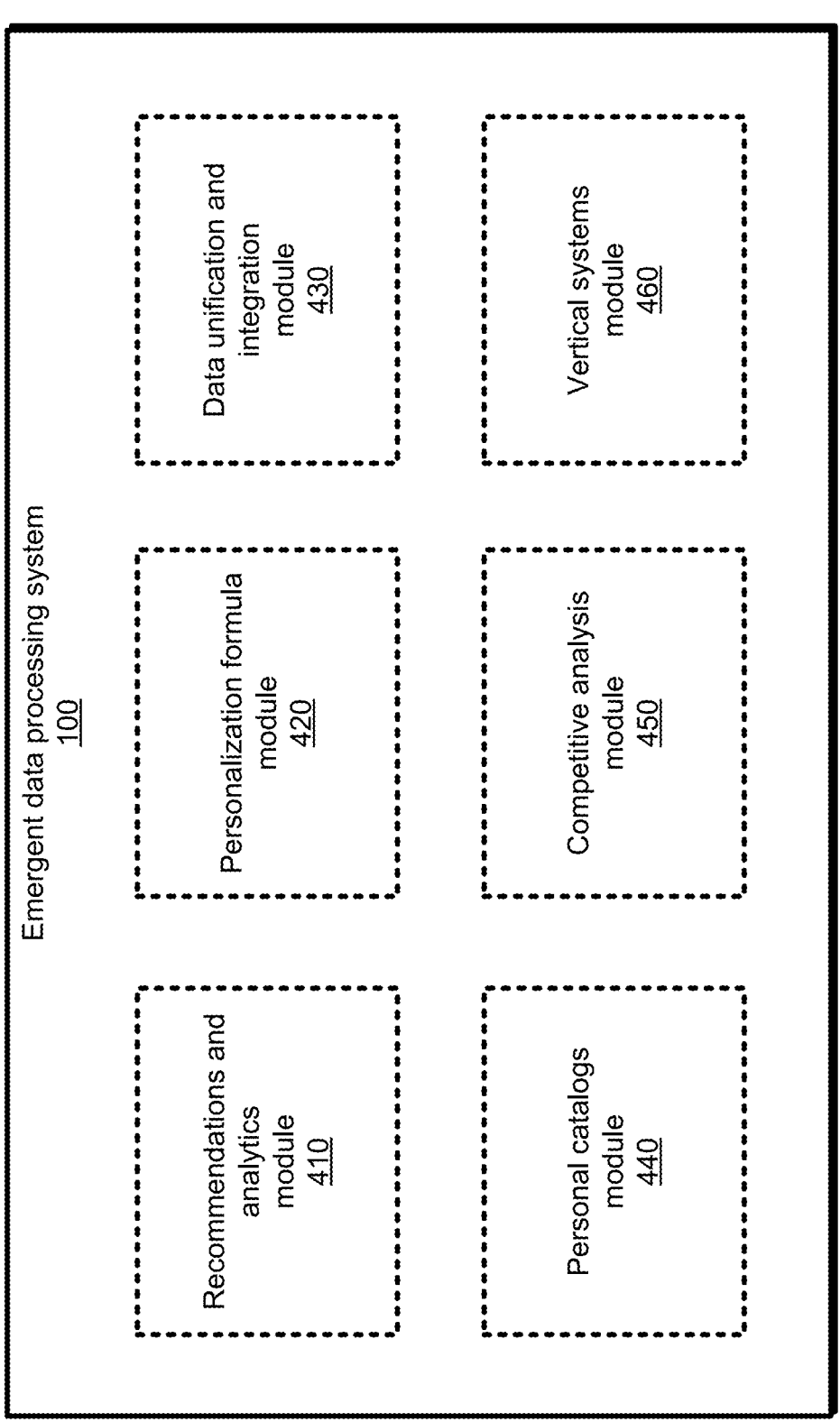
FIG. 4 is a diagram that illustrates examples of functional modules in the complex system.

FIG. 4 is a diagram that illustrates examples of functional modules in the emergent data processing system. Referring to FIG. 4, the emergent data processing system 100 described above can have multiple functions or services that can be implemented in separate but connected modules. In one implementation, the emergent data processing system 100 can have six modules: a recommendations and analytics module 410, a personalization formula module 420, a data unification and integration module 430, a personal catalogs module 440, a competitive analysis module 450, and a vertical systems module 460.

These modules can be hosted within a single, unified system that can include the appropriate servers, operations, integration, and any development. The applications related to the emergent data processing system 100 can run on various platforms, including but not limited to mobile, web, and email. In the operation of these modules, data is integrated by the emergent data processing system 100 to ensure that the most appropriate recommendations and personalizations are provided. The data can include company or retailer data as well as data from other users of the emergent data processing system 100.

With respect to the recommendations and analytics module 410, the emergent data processing system 100 can start with a piece of input data. The data can be related to a product, but it could just as easily be any other data, such as a search term, browsing history, or even information about the customer, for example. The emergent data processing system 100 can process and correlate the data based on a wide range of factors to generate a relevant recommendation. The resulting recommendation can also be a product but need not be so limited. The recommendation can just as easily be an article, image, catalog, recipe, question, answer, and/or video. For example, recipes indicate what kinds of foods go together, which can indicate what cooking tools are appropriate for those kinds of foods. Images can indicate that there are logical groupings of products and subjects by virtue of those products and subjects being together in the same image. Third parties like tech media websites that publish news, articles, blogs, and podcasts on technology and consumer electronics, can provide data that someone has manually linked or tagged, connecting specific accessories to main products. If there is a connection or expression between this data and data in the system, the emergent data processing system 100 can take advantage of it.

The recommendations and analytics module 410 of the emergent data processing system 100 can be configured to make recommendations from a variety of perspectives, including similar or closely related items, items frequently bought or viewed together, or accessories to the input product. The emergent data processing system 100 can produce many different types of primary recommendations and a large number of custom variations, which it can deploy based on the user's current context. Once generated by the recommendations and analytics module 410, the recommendations can be filtered using many techniques, including merchant black-listing by theme, or through the analysis of sentiment in the content. In addition to creating recommendations, the recommendations and analytics module 410 can provide the analytics and reporting needed to understand how the recommendations are performing and what needs attention. In this regard, the recommendations and analytics module 410 can be operable to track each recommendation, click, formula, marketing campaign, and order, for example. The recommendations and analytics module 410 can then use the data that is collected and analyzed to help marketing, merchandising and financial analysts understand what is going on and where there may be additional opportunities.

The personalization formula module 420 can be used in search, browse, email, and catalog applications, for example. Any application where the interests and preferences of the individual can be taken into consideration can use the results, analysis, functions, and/or operations of the personalization formula module 420. The emergent or learning functionality of the personalization formula module 420 enables an understanding of a customer at many levels of granularity. These levels can include individual levels, as a member of multiple cohorts (with their crowd-sourcing benefits), as well as any special groups that are latently or directly associated with the customer. In this process, the personalization formula module 420 can identify low level purchase and behavior patterns to determine the probability of activity and subject interests. In addition, while the emergent data processing system 100 looks to optimize recommendations for the customer, it is also balancing the recommendations against business goals, such as margin, revenue, competitive positioning, new customer acquisition, customer retention, and/or dormant customer activity, for example.

The emergent data processing system 100 can also address the needs of merchants to target customers with their products. This can be achieved by solving the connections that deliver the right customers when the business identifies product objectives or the right products when the business identifies customer objectives. The system can compute and consider data about age, family, and/or other factors without having to ask the customer. The emergent data processing system 100 can balance the intersection of this data and the appropriate directives to produce the best recommendations at the most appropriate price to the customer. Accordingly, blanket offers and discounts that typically lower prices to unsustainable levels can be eliminated. The emergent data processing system 100 can compute from the bottom up, looking at what the customer wants, what the company has, and how it compares against the competition enabling the emergent data processing system 100 to generate and provide recommendations for the best products that deliver the customer's needs at the best price and margin for the company.

With respect to the data unification and integration module 430, the emergent data processing system 100 can analyze and process a wide range of data dimensions. The data can be collected, organized, abstracted, and/or generalized, resulting in the emergent data processing system 100 being capable of handling much richer forms of recommendation. Extensive data, from many sources, can be used by the emergent data processing system 100 to fully understand and capitalize on the situations in which the various users operate. This unification approach allows the emergent data processing system 100 to push to a next level of services that other systems may not be able to provide.

Corporate data can typically be kept in silos and can constantly change. Attempts by other systems to create master ontologies or other top-down static views of the data can be ineffective. The emergent data processing system 100 is operable to handle the reality that the data can be imprecise, full of noise, constantly evolving, and routinely sporadic, missing and incorrectly documented. Data can be difficult to combine and does not stay consistent, despite what a typical system that uses rigid data warehousing techniques may promise. The emergent data processing system 100 can address and handle this issue by placing data into a graph-like data structure (e.g., a hyper-graph type structure) that is abstracted and semantically generalized to enable natural connections in the data to occur. This allows applications to work with content by expressing what is required indirectly (not having to exactly specify what is being search for or added to the graph, as other the exact wording involved is not required to still find ways to match data) and letting the emergent data processing system 100 translate that into the most appropriate selections and processes.

The emergent data processing system 100 is configured to reduce the ambiguity present in the content, while concurrently incorporating the multi-dimensional data into a wide variety of applications. The emergent data processing system 100 can handle and use a wide range of data types and sources. Many different types of data can be used to retrieve recommendations and can also be used as recommendations, for example products, videos, images, blogs, reviews, questions, answers and tasks. Data can be filtered and tagged in multiple dimensions, based not only on what is actually present in the content but also based on what is indirectly expressed or learned externally. This includes the ability to relate data to activities, create latent groups of experts, recommend people into groups, and manage data indirectly through themes and sentiment. The emergent data processing system 100 can supply application programming interfaces (APIs) that can be incorporated into applications and campaigns as they are processed inside the emergent data processing system 100, or are called externally and used in third-party applications.

With respect to the personal catalogs module 440, the emergent data processing system 100 can provide catalog-building functionality. The system can be constantly constructing a personal catalog for each user, collection of users, campaigns or any other target desired, collecting and displaying artifacts (e.g., products, items) that the user is likely to be interested in, artifacts that may have add-on value to something they have already purchased, and/or artifacts that can be related to activities that the emergent data processing system 100 determines the user may like or subjects they may have an interest in. These catalogs can be "buy-catalogs" in which the company or retailer can get out in front of the user, understanding and anticipating what the user may need, and giving the user what they may want to buy instead of the traditional user search and browse paradigm forcing the user to find what they want. Each of the recommendation techniques supported by the emergent data processing system 100, or any internal or external list of data, can be used to generate a personal catalog which can do one or more of organizing a history of a customer's interaction, providing deeper recommendations, and using agents to keep up with changes or price targets.

When organizing a history of the customer's interaction with a retail environment, personal catalogs can provide a snapshot of the customer's actions over time. As a result, even though a customer may not have acted when an event was occurring, the personal catalog can allow them to go back and reconnect with a point in time where they can reengage in that area covered by the personal catalog.

With respect to deeper recommendations, each recommendation that is made, in various selections of combinations, can be turned into catalogs, both large and small by the personal catalogs module 440 of the emergent data processing system 100. Even without actual campaigns, data can be fed into the system to direct the construction of catalogs, and each catalog can be linked into a master catalog for that customer, compiling a table of contents and a back of book style index so the customer can easily browse a collection of catalogs (e.g., events). The customer can also share the catalog with others and make notes in it. The customer can purchase directly from the catalog, taking them right to the checkout page. In this regard, the emergent data processing system 100 can call the retailer's add-to-cart and then transfer the customer to the retailer's checkout page.

Agents can be an opt-in capability for each catalog generated, which then allows the emergent data processing system 100 to communicate in a more personal style with the customer whenever changes (e.g., product, price) occur inside their catalog of interest. The communication can be more personal because the agent knows the customer, the products involved, the current context, and the current event. This allows the agent to customize the messaging instead of using generic one-size-fits-all messages. The emergent data processing system 100 can reevaluate the catalog and makes updates (e.g., daily, weekly) as needed with product deletions, additions, price changes, and the like. The emergent data processing system 100 can communicate with the customer on a weekly basis or as needs dictate With respect to the competitive analysis module 450, the emergent data processing system 100 is operable to do relative competitor analysis. A customer's purchase can be a zero-sum transaction in that a purchase from one retailer means that the customer is not buying from other retailers. No personalization system can be truly successful without understanding that the decisions are as much about understanding the customer and the product as they are about understand the competitors and their comparative pricing and content quality. It is therefore relevant to look at every recommendation relative to how it stacks up against the competition should the customer be comparing products and/or pricing. The emergent data processing system 100 can compare a product from a client retailer against one or more products from competing retailers. The emergent data processing system 100 can base its analysis in the competitor's pricing, quality of product collateral descriptions, and general coverage of similar items (assortment) when matching and comparing the same or similar products.

The functionality provide by the competitive analysis module 450 need not be limited to the traditional approaches of product matching that typically use information such as brand and model or universal product code (UPC) type. Instead, the emergent data processing system 100 can use not only that kind of information but also other available information, enabling the emergent data processing system 100 to make more informed decisions and to work with products individually and in sets to make the most appropriate determination as to what is the position of a client retailer's product relative to the competition. This enables the retailer using the emergent data processing system 100 to minimize competitive disadvantages and to craft a winning strategy when there is comparison shopping.

The emergent data processing system 100 can use the comparative pricing and product quality results to inform its recommendations. In addition, the emergent data processing system 100 is not limited to implementing and using this technique just on the analysis of competitor's products. The emergent data processing system 100 can apply this technique to other types of data, for example, reviews, blogs, videos, pictures, activities, questions, and/or answers. When products can be evaluated relative to external content and filtered for positive sentiment, such information can be analyzed and used by the emergent data processing system 100 when generating recommendations and user catalogs. The information produced from the competitive analysis can also be used to alter the order of recommendations when external content is deemed negative or when the customer is determined to be one that is sensitive to price or content.

The vertical systems module 460 can be used in, for example, consumable products. A recipe management system is an example of a vertical application that can be implemented in the emergent data processing system 100. Such system can use information in the emergent data processing system 100 to read and understand recipes, their ingredients, cooking instructions, cooking tools needed, and to determine which products (e.g., in addition to the actual food products) can be of interest to the customer that is intended to make the recipe. The emergent data processing system 100 can provide information to the customer to help shop for consumables and cooking tools, determine what is needed and missing, and what other recipes could be made from any list of food products. For example, multiple recipes, each with multiple ingredients, can enables the emergent data processing system 100 to determine the kind of cooking the user may be doing, what ingredients might be needed, and also what cooking tools are likely needed. In addition, the emergent data processing system 100 can analyze personal and cohort repurchase dates to make predictions of what else the cohorts are using and the current customer is not.

Figure 5:
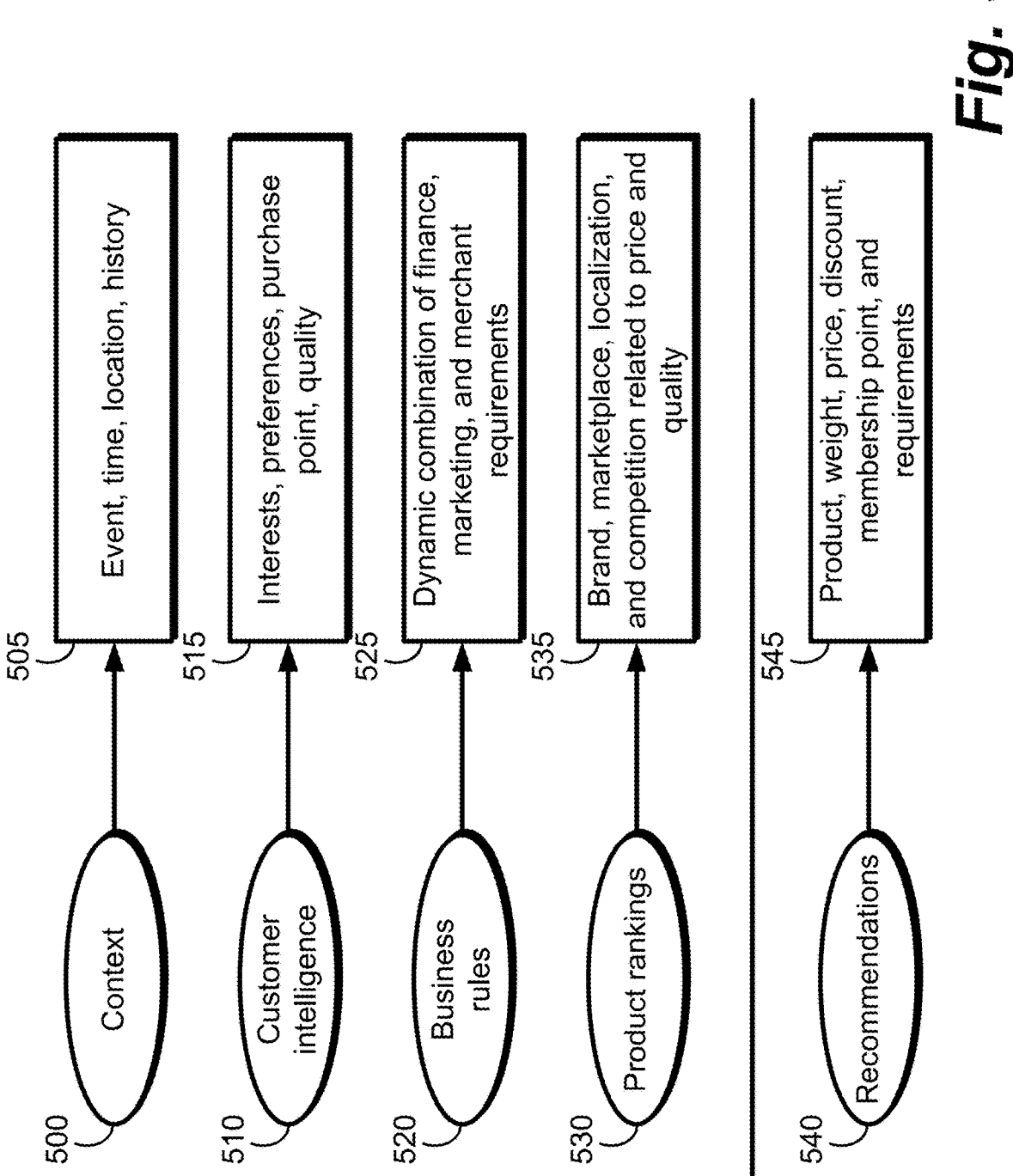
FIG. 5 is a diagram that illustrates an example of a personalization formula used by the complex systems and emergent data system.

FIG. 5 is a diagram that illustrates an example of a personalization formula used by the emergent data processing system. Referring to FIG. 5, there is shown an implementation of the functionality associated with the personalization formula module 420 described above with respect to FIG. 4. In this implementation, different factors can be considered in making a personalization analysis. Such factors can include context 500, customer intelligence 510, business rules 520, and product rankings 530.

The context 500 can include individual aspects 505 such as event, time, location, and/or history, for example. The customer intelligence 510 can include individual aspects 515 such as interests, preferences, purchase point, and/or quality, for example. The business rules 520 can include individual aspects 525 such as dynamic combination of finance, marketing, and/or merchant requirements, for example. The product rankings 530 can include individual aspects 535 such as brand, marketplace, localization, and/or competition related to price and quality, for example.

The information in the context 500, the customer intelligence 510, the business rules 520, and the product rankings 530 can be combined to produce a recommendation 540 that includes individual aspects 545 such as product, weight, price, discount, membership point, and/or requirements, for example. Any computations or formulas can consider many relationships in the graph, such as the importance of revenue relative to margin, the importance of acquiring new customers relative to revenue, the importance of a customers current interests relative to their previous interests and/or to price reductions, the importance of the popularity in general of the product relative the more specific match to the customers interests, and/or the importance of recommending products where the company has a better assortment and pricing than the competitors. These comparisons can be made by producing weighted values to determine an appropriate recommendation.

Figure 6:
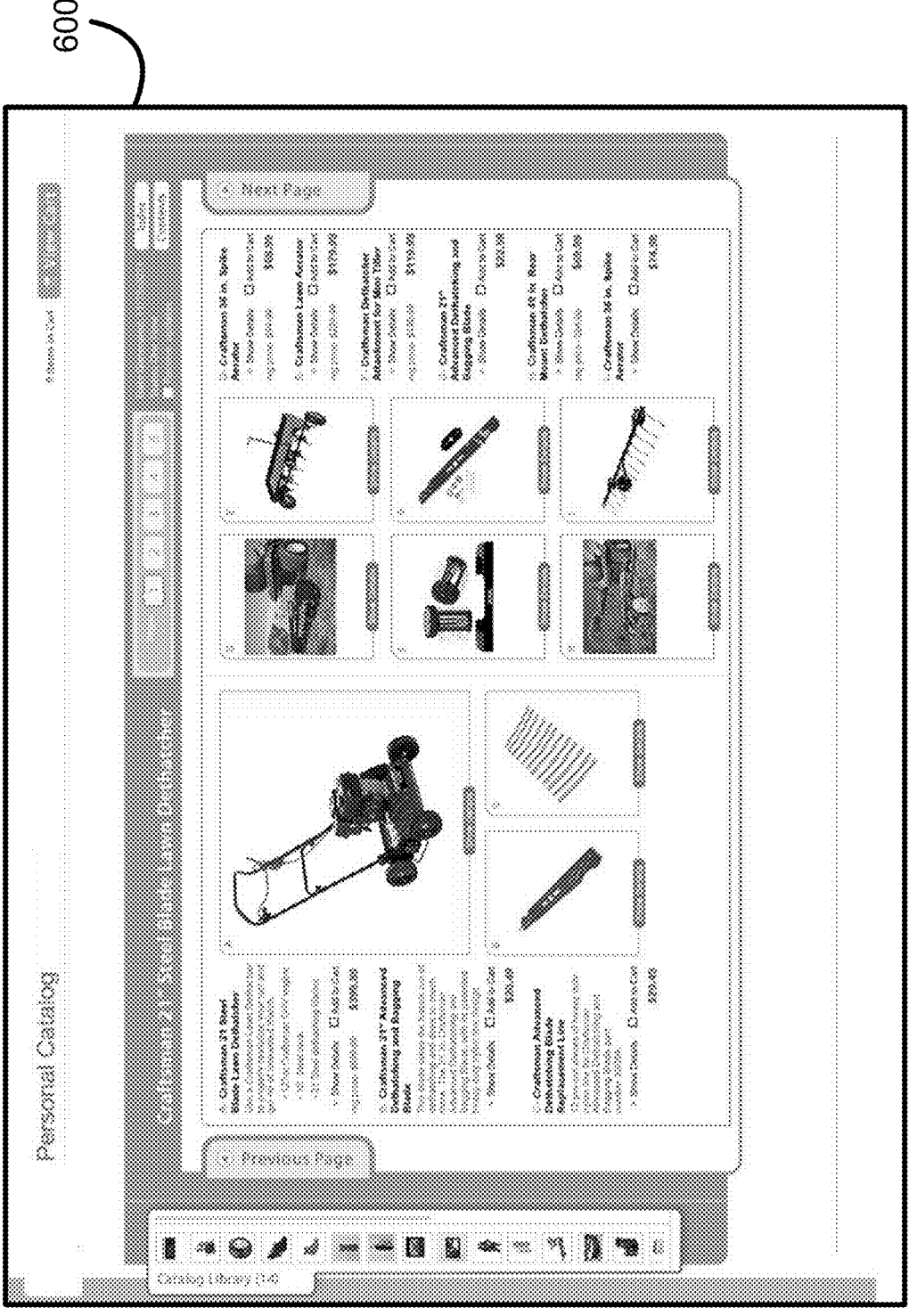
FIG. 6 is a screenshot that illustrates an example of a personal catalog generated by the emergent data processing.

FIG. 6 is a screenshot that illustrates an example of personal catalog generated by the emergent data processing system. Referring to FIG. 6, there is shown an implementation of the functionality associated with the personal catalogs module 440 described above with respect to FIG. 4. In this implementation, a screenshot 600 of a personal catalog can be generated by the emergent data processing system 100 to highlight a particular type of lawn mower and other related accessories that may be of interest to a particular customer. The layout and/or the information presented in the screenshot 600 are provided by way of illustration and not of limitation.

There are various aspects for consideration when generating a personal catalog using the emergent data processing system 100. For example, certain sections of the personal catalog can be of importance and can be identified as such, the personal catalog can be automatically generated, historical snapshots may be kept, the personal catalog may be organized by major product verticals, by activities, and/or by subjects, indexes and table of contents can be created, the content inside the personal catalog can be personalized, and different aspects of the recommendations inside the personal catalog can be tracked such as those that have new prices, replacement products, and/or are trending popular right now.

Another aspect can be to create a personal catalog by providing input or some other information to the personal catalog of what the user is interested in. Moreover, another aspect can be to easily find variants of an item and update the personal catalog with some or all of the variants.

Figure 7A:
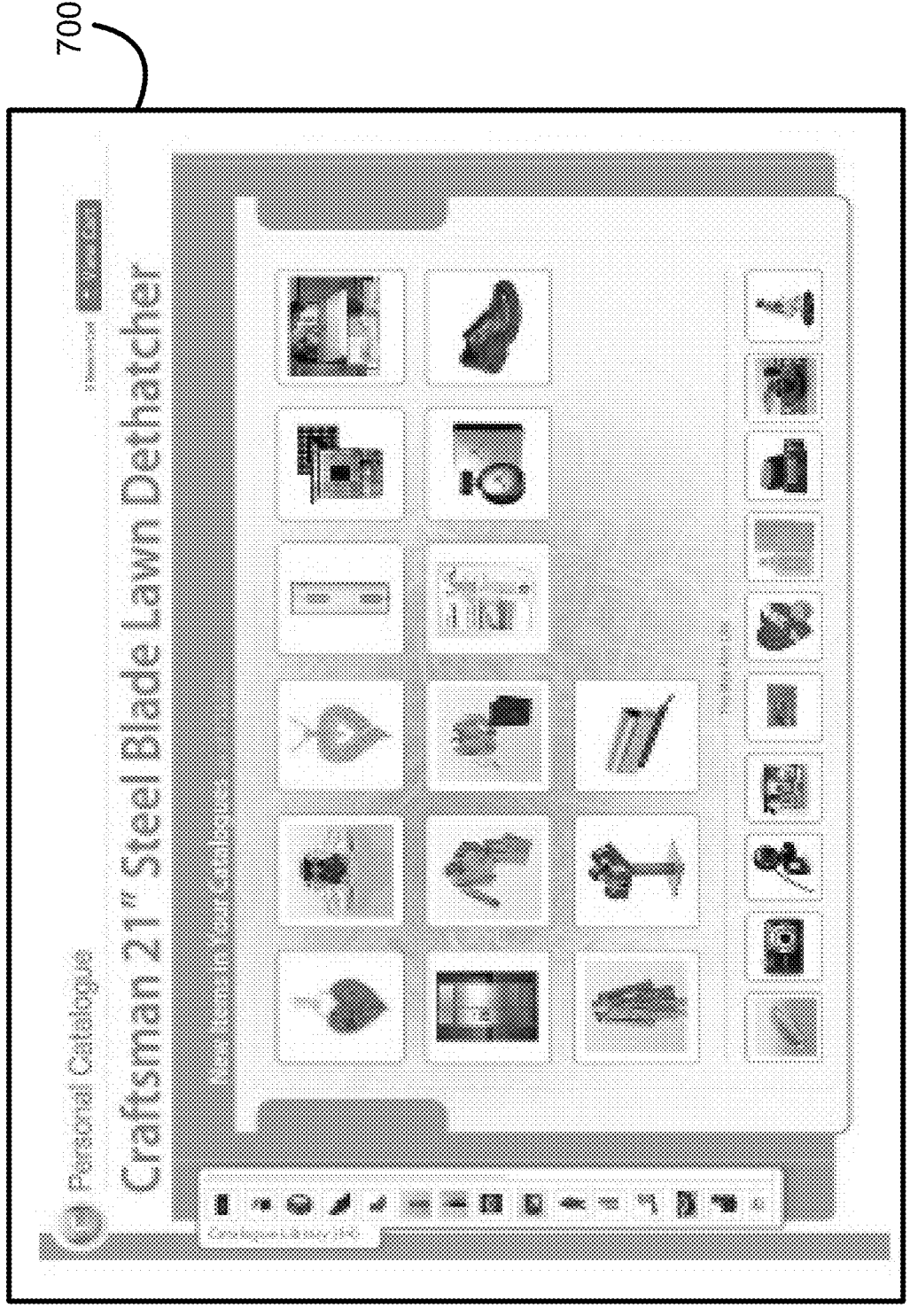
FIGS. 7A-7C are each a screenshot that illustrates additional examples of personal catalogs generated by the emergent data processing.
Figure 7B:
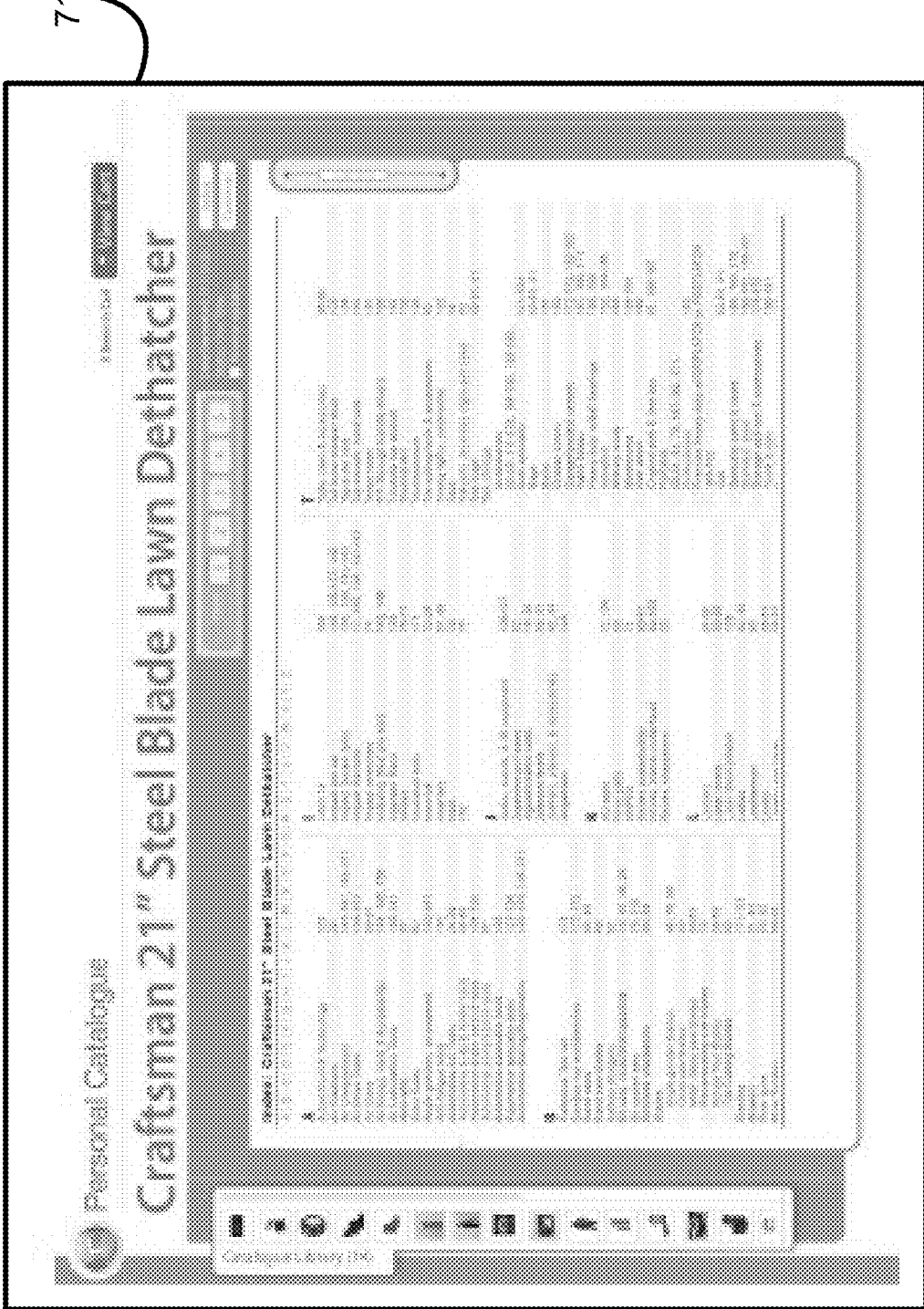
Figure 7C:
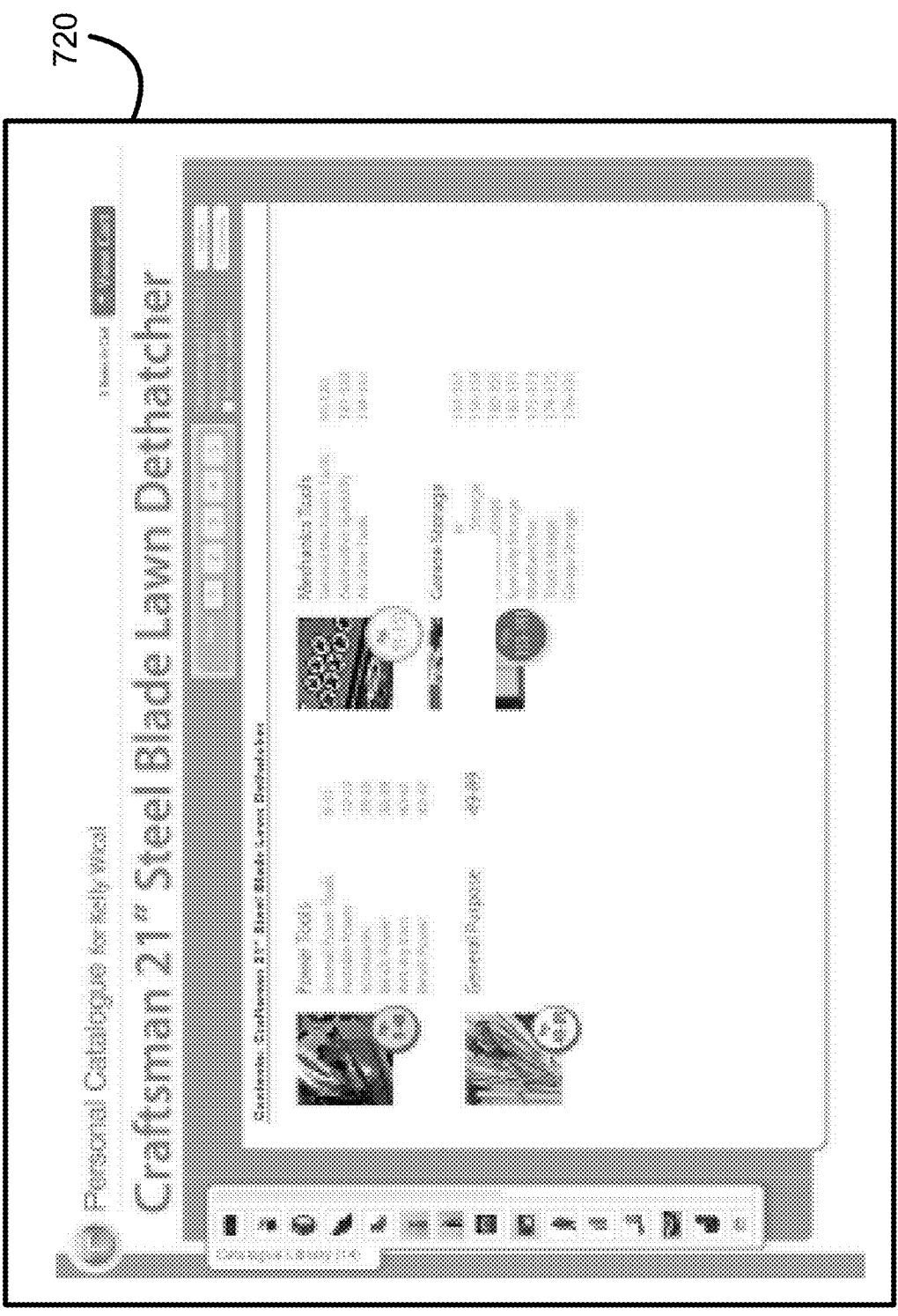

FIGS. 7A-7C are each a screenshot that illustrates additional examples of personal catalogs generated by the emergent data processing system. These figures show an implementation of the functionality associated with the personal catalogs module 440 described above with respect to FIG. 4. Referring to FIG. 7A, there is shown a screenshot 700 of a personal catalog that includes new products or items that the emergent data processing system 100 has identified as being of possible interest to a customer. FIG. 7B shows a screenshot 710 of a personal catalog that includes an alphabetical index of items available to the customer in the personal catalog. FIG. 7C shows a screenshot 720 of a personal catalog that includes related products or items. For example, screenshot 720 can provide tools or hardware that is related to yard work given the interest the customer may have on lawn mower as illustrated by the screenshot 600 shown in FIG. 6. The layout and/or the information presented in the screenshots 700, 710, and 720 are provided by way of illustration and not of limitation.

Figure 8:
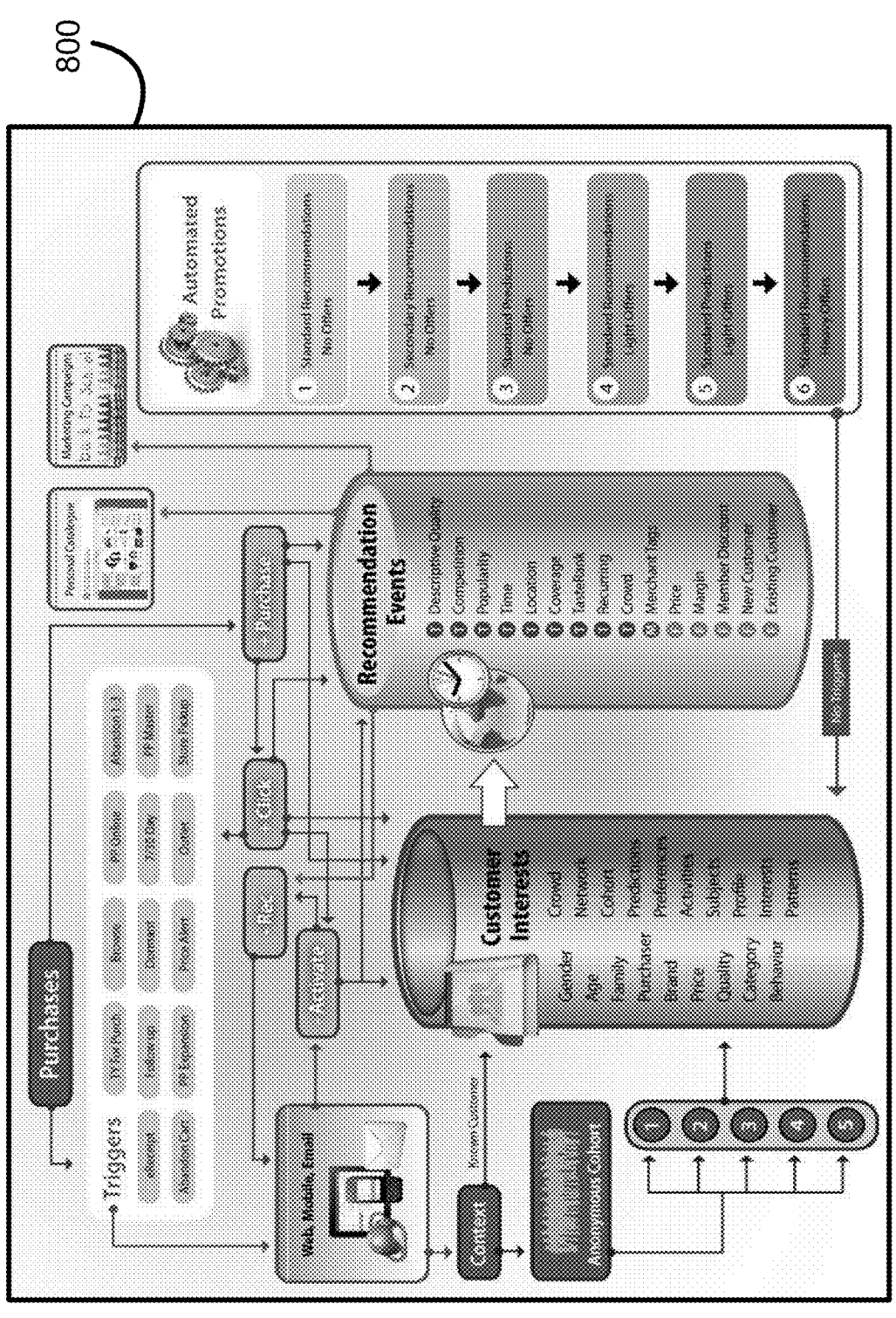
FIG. 8 is a diagram that illustrates touch points and feedback in the emergent data processing system.

FIG. 8 is a diagram that illustrates touch points and feedback in the emergent data processing system.

Figure 9:
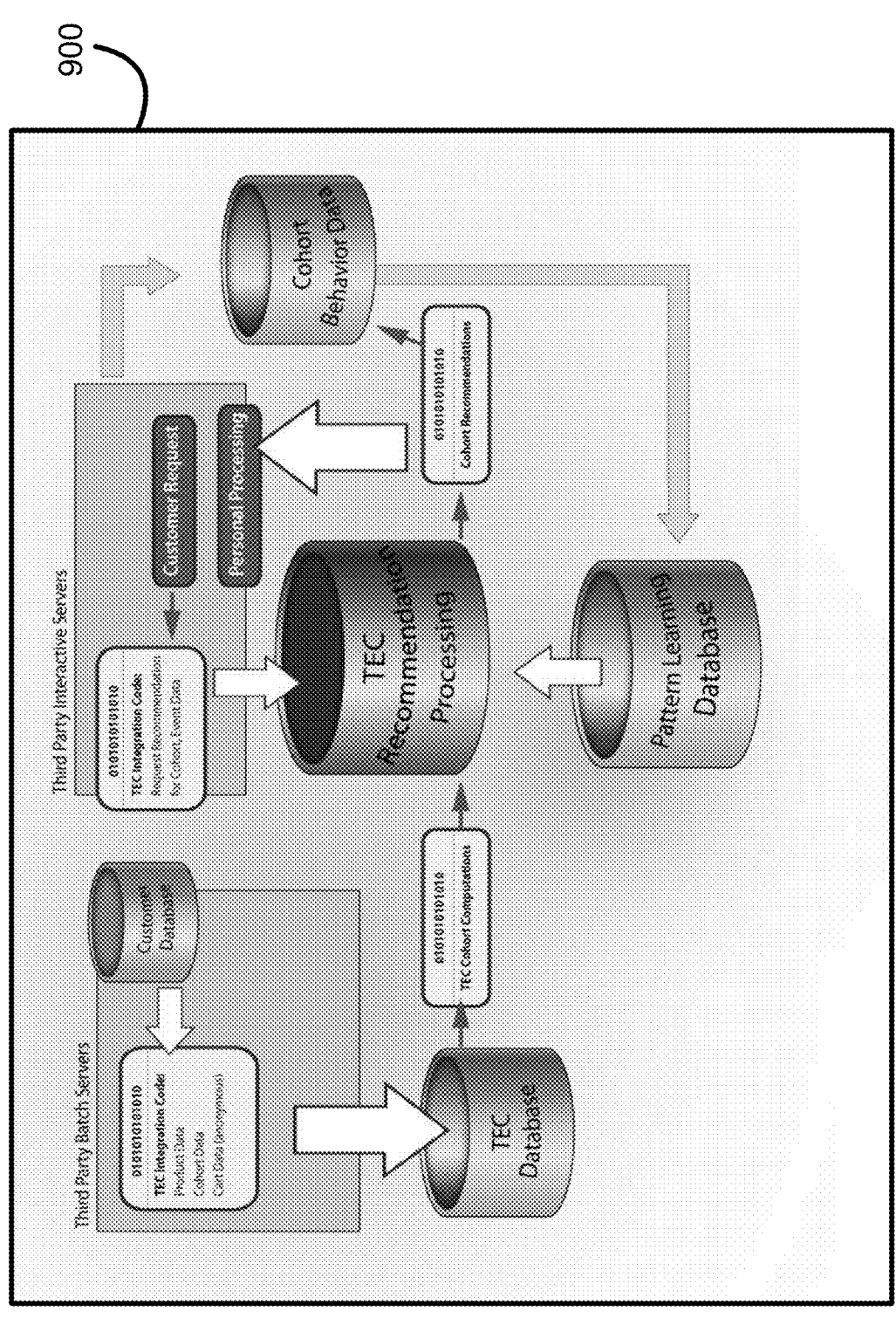
FIG. 9 is a diagram that illustrates an example of privacy policies in the emergent data processing.

FIG. 9 is a diagram that illustrates an example of privacy policies in the emergent data processing system. Referring to FIG. 9, there is shown a system 900 that uses an emergent data processing system (e.g., TEC) to provide privacy operations. To generate personalized recommendations between a company or retailer and third-party systems, the emergent data processing system may not be able to pass personal information to the third-party system because of privacy policies regarding the use of personal data. Instead of using personal data, other information can be integrated such as product data and/or cohort data. The cohort data can be limited to include a summation of personal data to adhere to the privacy policies. By using the approach described above, the emergent data processing system can properly compute the recommendations up to the individual level.

The emergent data processing system can have code resident on the third-party systems that can access personal data during the last steps of processing and apply results to the recommendations returned from the emergent data processing system based on cohorts. This approach enables the generation of personalized results but within the privacy policies supported by the parties involved. These servers work by calling the emergence data processing system in a generic way, without providing specific customer information. Then, upon receiving the data back from the emergent data processing system, the third-party system can apply personal adjustments to the data, either by using its own personal data, or by having personal computation algorithms from the emergent data processing system resident on the third party system, and executing this phase on those servers. In this way, the primary (host) server does not need to see personal data.

Figure 10A:
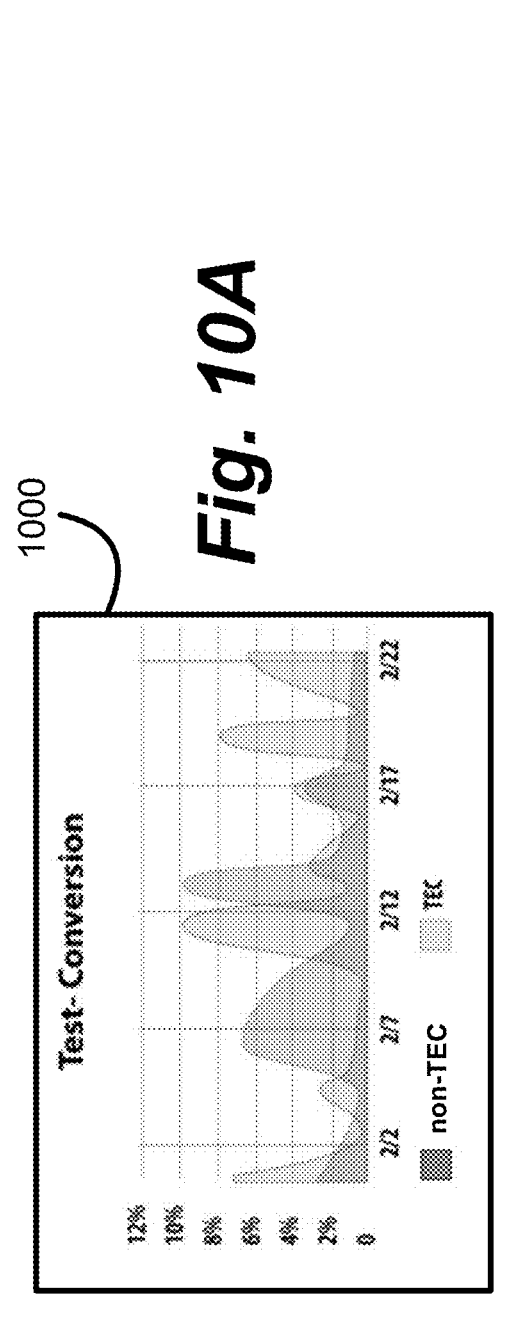
FIGS. 10A-10C are each a diagram that illustrates example of performance benchmarks produced to evaluate the emergent data processing in making predictions and recommendations.
Figure 10B:
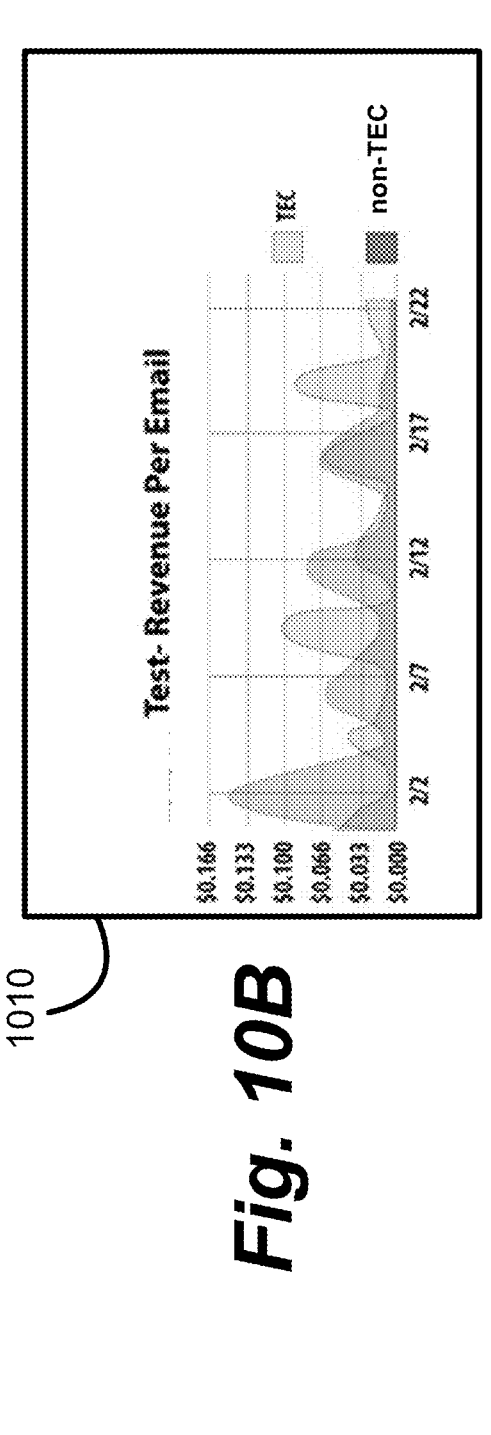
Figure 10C:
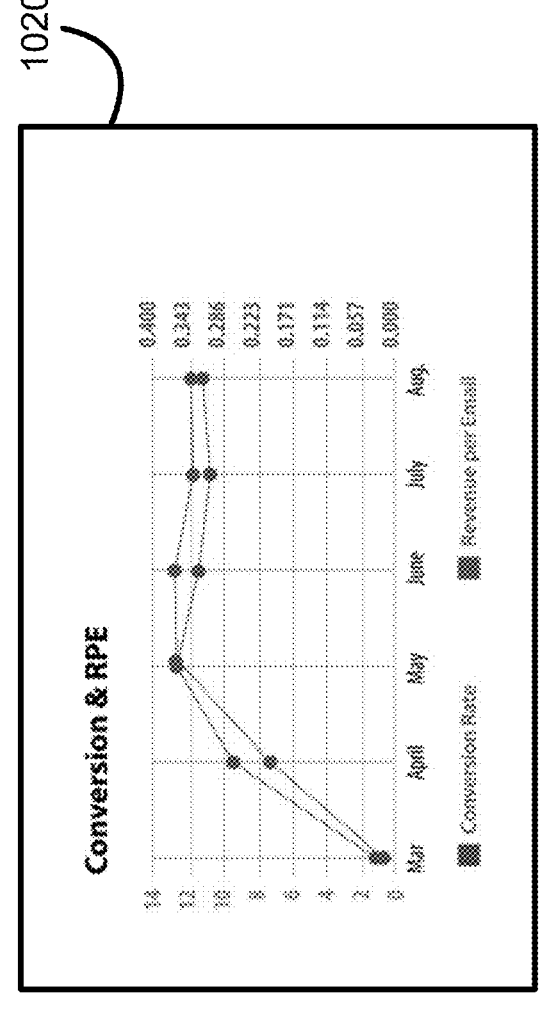

FIGS. 10A-10C are each a diagram that illustrates examples of performance benchmarks produced to evaluate the emergent data processing system. Referring to FIG. 10A, there is shown a graph 1000 that illustrates results from testing of an implementation of the emergent data processing system 100 (e.g., TEC) against other systems (e.g., non-TEC). The tests included email-based product recommendations across a wide range of products. Graph 1000 provides conversion results (the number of orders factored against the number of emails sent), which show as good or better results than the conversion provided by other techniques.

Referring to FIG. 10B, there is shown a graph 1010 that also illustrates results from testing of an implementation of the emergent data processing system 100 (e.g., TEC) against another system (e.g., non-TEC). Graph 1010 provides revenue-per-email (RPE) results, which show as good or better results than the RPE provided by the competitor.

Referring to FIG. 10C, there is shown a graph 1020 that also illustrates results from testing of an implementation of the emergent data processing system 100 (e.g., TEC). Graph 1020 provides combined conversion and RPE results for the emergent data processing system 100.

Figure 11A:
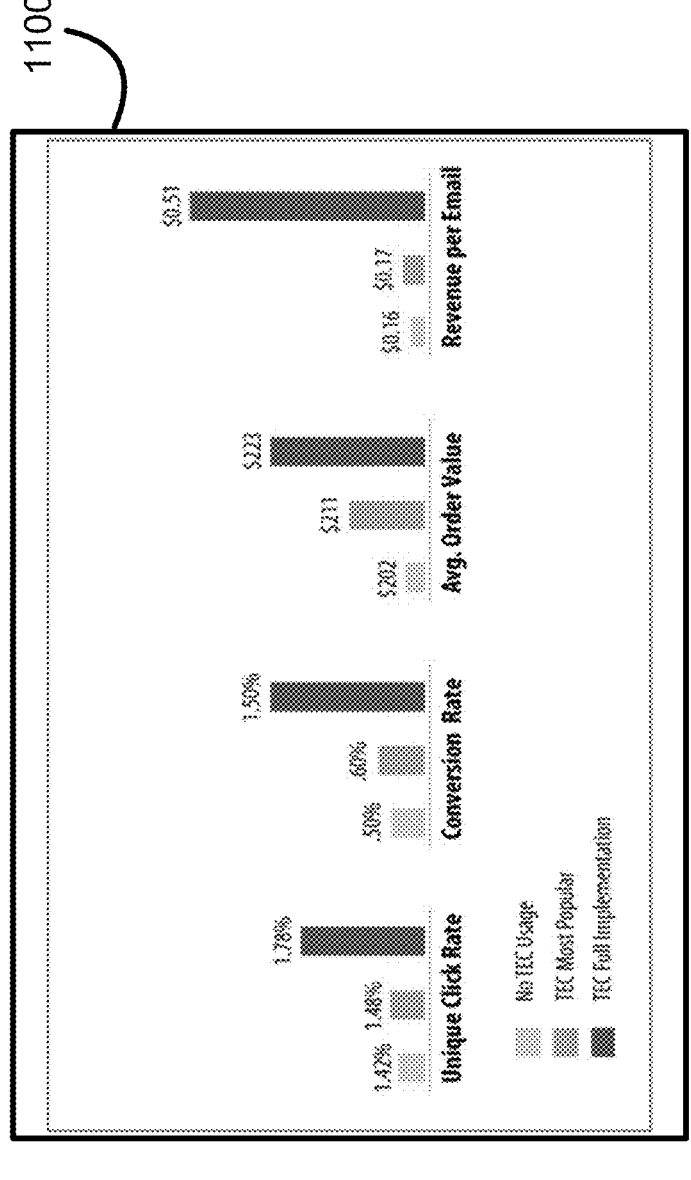
FIGS. 11A and 11B are each a diagram that illustrates additional examples of performance benchmarks produced to evaluate the emergent data processing in making predictions and recommendations.
Figure 11B:
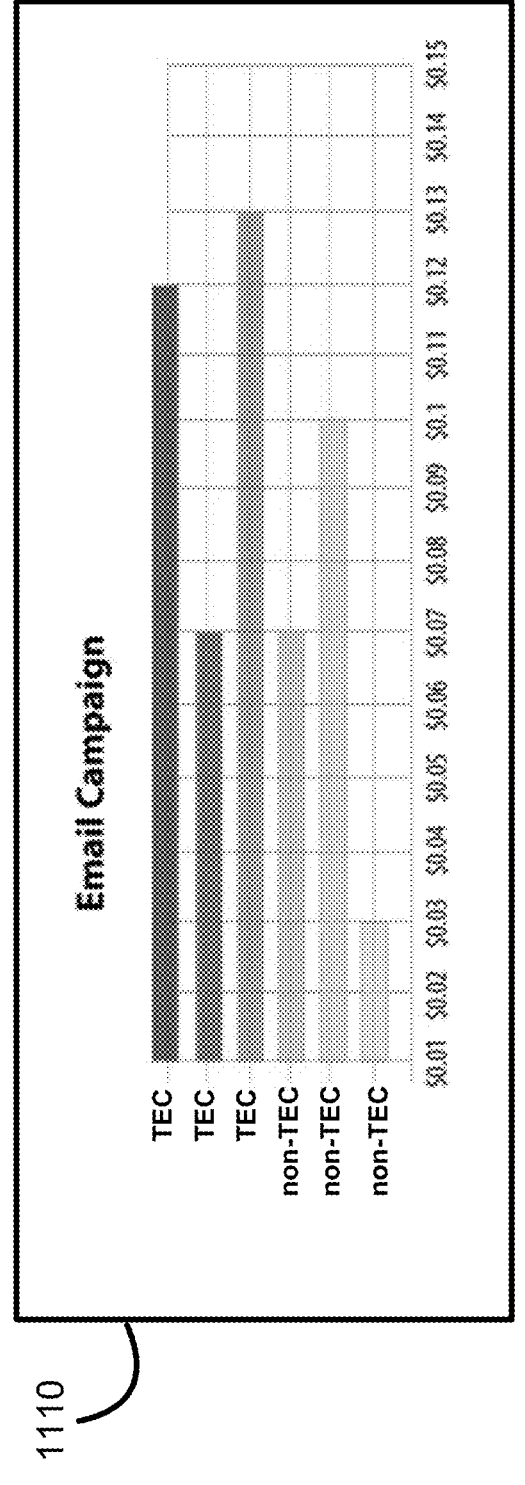

FIGS. 11A and 11B are each a diagram that illustrates additional examples of performance benchmarks produced to evaluate the emergent data processing system. Referring to FIG. 11A, there is shown a graph 1100 that illustrates results from testing of an implementation of the emergent data processing system 100 (e.g., TEC). These tests included email promotions campaigns in which the performance of the emergent data processing system 100 was compared with products selected by merchants based on their perspective and experience. The results show better outcomes when the emergent data processing system 100 is used in connection with unique click rates, conversion rated, average order value, and revenue-per-email.

Referring to FIG. 11B, there is shown a graph 1110 that also illustrates results from testing of an implementation of the emergent data processing system 100 (e.g., TEC). Graph 1110 provides tests results from an email campaign that shows that the emergent data processing system 100 (e.g., TEC) is capable of generating higher revenue than other, non-emergent technology systems (e.g., non-TEC).

Figure 12:
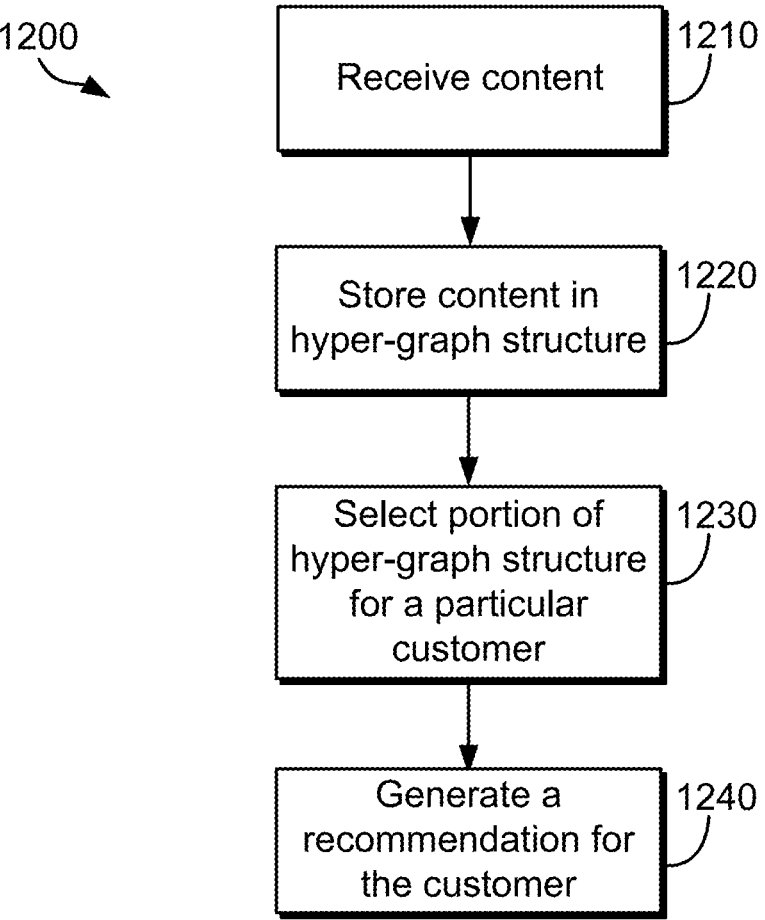
FIGS. 12-14 are each a flow diagram that illustrates examples of steps for data handling by the complex systems and emergent data processing.
Figure 13:
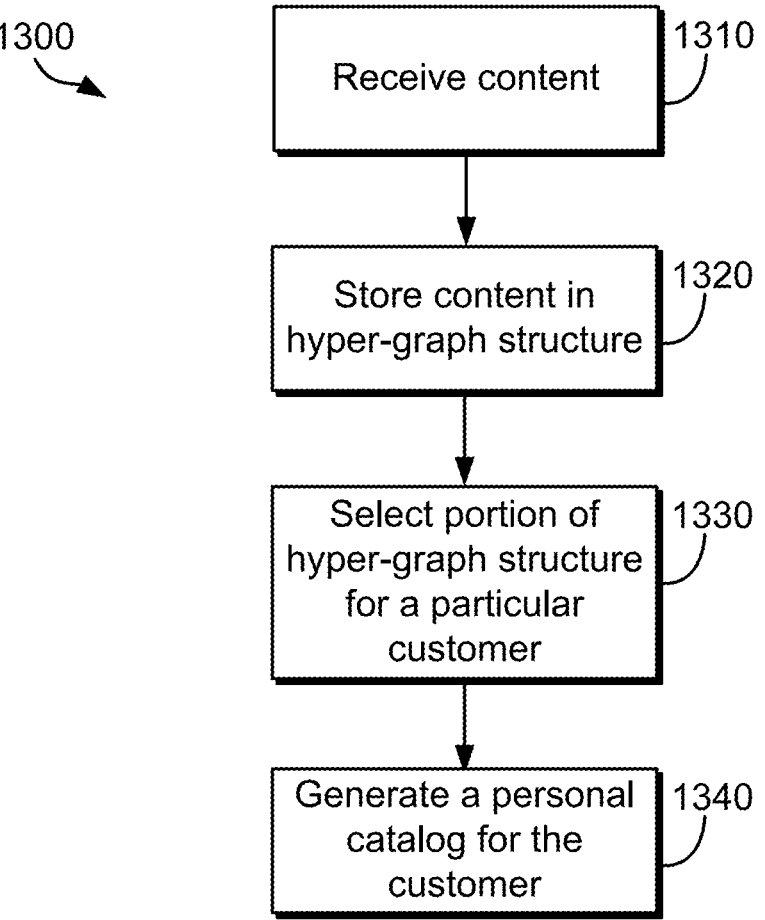
Figure 14:
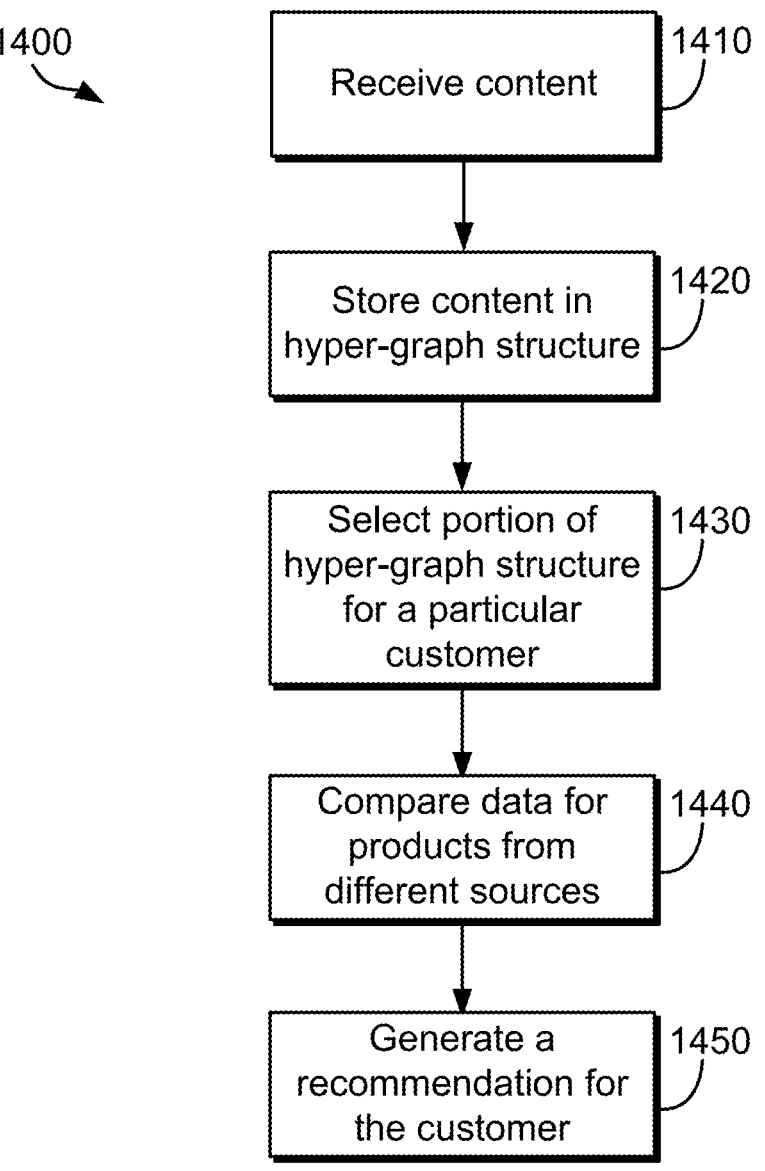

FIGS. 12-14 are each a flow diagram that illustrates examples of steps for data handling by the emergent data processing system. Referring to FIG. 12, there is show a flow chart 1200 in which, at step 1210, the emergent data processing system 100 described above can receive content such as customer or user data and/or product data, for example. At step 1220, the emergent data processing system 100 can store the content into a hyper-graph structure such as the one illustrated in FIGS. 3A and 3B. At step 1230, the emergent data processing system 100 can select a portion of the hyper-graph structure that corresponds to a particular customer or user. At step 1240, the emergent data processing system 100 can base a recommendation for a product or some other item based on the content in the selected portion of the hyper-graph structure.

Referring to FIG. 13, there is shown a flow chart 1300 in which, at step 1310, the emergent data processing system 100 described above can receive content such as customer or user data and/or product data, for example. At step 1320, the emergent data processing system 100 can store the content into a hyper-graph structure such as the one illustrated in FIGS. 3A and 3B. At step 1330, the emergent data processing system 100 can select a portion of the hyper-graph structure that corresponds to a particular customer or user. At step 1340, the emergent data processing system 100 can generate a personal catalog for the customer or user based on the content in the selected portion of the hyper-graph structure.

Referring to FIG. 14, there is show a flow chart 1400 in which, at step 1410, the emergent data processing system 100 described above can receive content such as customer or user data and/or product data, for example. At step 1420, the emergent data processing system 100 can store the content into a hyper-graph structure such as the one illustrated in FIGS. 3A and 3B. At step 1430, the emergent data processing system 100 can select a portion of the hyper-graph structure that corresponds to a particular customer or user. At step 1440, the emergent data processing system 100 can compare data for products from different sources (e.g., different retailers). the At step 1450, the emergent data processing system 100 can base a recommendation for a product or some other item based on the content in the selected portion of the hyper-graph structure and on the results from the comparison made in step 1440.

Another implementation provides for a non-transitory machine and/or computer readable storage and/or media, having stored thereon, a machine code and/or a computer program having at least one code section executable by a machine and/or a computer, thereby causing the machine and/or computer to perform the steps as described herein for emergent data processing.

Accordingly, the present disclosure can be realized in hardware, software, or a combination of hardware and software. The present disclosure can be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure can also be embedded in a computer program product, which includes all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to a particular implementation disclosed, but that the present disclosure will include all implementations falling within the scope of the appended claims.

What is claimed is:

1. A method, comprising:

in a system comprising at least one server operable to handle retail data and communicate electronic messages with at least one customer device:

maintaining a hyper-graph structure;

receiving content from a first source of data, wherein: the content comprises a plurality of components of customer data and product data, and one or more of the components comprise data in one or more undocumented fields;

storing, in the memory, the plurality of components of the received content to establish interconnections in the hyper-graph structure of the received data with a plurality of components of content for related customer data and product data from other sources, wherein:

the data in the one or more undocumented fields are placed unaltered in the hyper-graph structure, and the data from the one or more undocumented fields are understood via their interconnections in the hyper-graph structure, the interconnections being dynamically generated by mapping each undocumented field into a typed node or edge using semantic similarity measures, such that heterogeneous data formats are normalized into a unified graph representation without requiring schema modification, thereby reducing computational overhead and improving data integration performance;

filling in particular components missing from data of a first customer in the hyper-graph structure using known values of the particular components in data of a second customer in the hyper-graph structure, according to an amount of intersection of other components of the data of the first customer and the second customer, wherein:

the known values are weighted to indicate that the filled-in components are characteristic of the first customer, and the known values are weighted to indicate that the filled-in components are not characteristic of the first customer;

selecting a portion of the hyper-graph structure according to similarity of components of data for a particular customer to components of customer data present in the hypergraph structure;

performing a vertical analysis of consumable products of the selected portion of the hyper-graph structure;

constructing a personal catalog from at least one recommendation for the particular customer according to the content in the selected portion of the hyper-graph structure, for transmission to a device of the particular customer for viewing; and providing a graphical user interface that comprises one or more graphical elements that can be selected to organize and display the personal catalog according to the performed vertical analysis.

2. The method of claim 1, wherein:

the recommendation comprises one or more of a product, an article, an image, a catalog, a recipe, a question, an answer, and a video.

3. The method of claim 1, comprising filtering the recommendation according to one or both of a merchant black-listing by theme and sentiment information about the particular customer.

4. The method of claim 1, comprising generating the recommendations for the particular customer according to business parameters stored in the at least one server, the business parameters comprising one or more of margin, revenue, competitive positioning, costumer acquisition, customer retention, and customer activity.

5. The method of claim 1, wherein:

the first customer is one of a plurality of customers, the plurality of customers are characterized by multiple personas, each persona is associated with characteristics and data from the plurality of customers, the system determines which of the multiple personas is prevailing at a particular time or for a particular interaction for the first customer, and

the prevailing persona is associated with characteristics and data from the plurality of customers comprising the first customer.

6. The method of claim 1, wherein the customer data or product data comprises data of different formats, the method comprising:

normalizing the customer data or the product data through abstraction and semantic generalization; and after normalization, storing the customer data or the product data into the hyper- graph structure.

7. The method of claim 1, wherein one or both of the first customer and the second customer can be defined in an emergent data processing system using dynamic data dimensions.

8. The method of claim 1, comprising:

generating an electronic message that comprises the recommendation; and tracking an interaction of the particular customer with the recommendation in the electronic message.

9. The method of claim 1, comprising:

dynamically connecting the interconnections at various levels of granularity and interpretation.

10. A method, comprising:

in a system comprising at least one server that is operable to handle retail data and to communicate electronic messages with at least one customer device, maintaining a hyper-graph structure;

receiving content from a first source of data, wherein:

the content comprises a plurality of components of customer data and product data, and one or more of the components comprise data in one or more undocumented fields;

storing the plurality of components of the received content to establish interconnections in the hyper-graph structure of the received data with a plurality of components of content for related customer data and product data from other sources, wherein:

the data in the one or more undocumented fields are placed unaltered in the hyper-graph structure, and the data from the one or more undocumented fields are understood via their interconnections in the hyper-graph structure, the interconnections being dynamically generated by mapping each undocumented field into a typed node or edge using semantic similarity measures, such that heterogeneous data formats are normalized into a unified graph representation without requiring schema modification, thereby reducing computational overhead and improving data integration performance;

normalizing, in the memory of the at least one server, the plurality of components of the received content to establish interconnections in the hyper-graph structure of the received data with a plurality of components of content for related customer data and product data from other sources;

filling in particular components missing from data of a first customer in the hyper-graph structure using known values of the particular components in data of a second customer in the hyper-graph structure, according to an amount of intersection of other components of the data of the first customer and the second customer, wherein:

the known values are weighted to indicate that the filled-in components are true for the first customer, and

the known values are weighted to indicate that the filled-in components are not true for the first customer;

selecting a portion of the hyper-graph structure according to similarity of components of data for a particular customer to components of customer data present in the hypergraph structure;

performing a vertical analysis of consumable products of the selected portion of the hyper-graph structure;

constructing a personal catalog from at least one recommendation for the particular customer according to the content in the selected portion of the hyper-graph structure, for transmission to a device of the particular customer for viewing; and providing a graphical user interface that comprises one or more graphical elements that can be selected to organize and display the personal catalog according to the performed vertical analysis.

11. The method of claim 10, wherein the personal catalog comprises historical interaction information of the particular customer.

12. The method of claim 10, wherein the personal catalog comprises a recommendation that comprises one or more of a product, an article, an image, a catalog, a recipe, a question, an answer, and a video.

13. The method of claim 12, comprising:

determining one or more items related to the recommendation; and providing the one or more items in the personal catalog.

14. The method of claim 10, comprising linking the personal catalog to one or more additional catalogs corresponding to the particular customer.

15. The method of claim 10, wherein the selected portion of the hyper-graph structure corresponds to a cohort of customers that comprises the particular customer.

16. The method of claim 10, comprising configuring the interconnections to dynamically connect at various levels of granularity and interpretation.

17. A method, comprising:

in a system comprising at least one server that is operable to handle retail data and to communicate electronic messages with at least one customer device, the at least one server comprising memory configured to maintain a hyper-graph structure, receiving content from a first source of data, wherein:

the content comprises a plurality of components of customer data and product data, and one or more of the components comprise data in one or more undocumented fields;

storing, in the memory, the plurality of components of the received content to establish interconnections in the hyper-graph structure of the received data with a plurality of components of content for related customer data and product data from other sources, wherein:

the data in the one or more undocumented fields are placed unaltered in the hyper-graph structure, and the data from the one or more undocumented fields are understood via their interconnections in the hyper-graph structure, the interconnections being dynamically generated by mapping each undocumented field into a typed node or edge using semantic similarity measures, such that heterogeneous data formats are normalized into a unified graph representation without requiring schema modification, thereby reducing computational overhead and improving data integration performance;

filling in particular components missing from data of a first customer in the hyper-graph structure using known values of the particular components in data of a second customer in the hyper-graph structure, according to an amount of intersection of other components of the data of the first customer and the second customer, wherein:

the known values are highly weighted to indicate that the filled-in components are characteristic of the first customer, and the known values are lowly weighted to indicate that the filled-in components are not characteristic of the first customer;

selecting a portion of the hyper-graph structure according to similarity of components of data for a particular customer to components of customer data present in the hypergraph structure;

performing a vertical analysis of consumable products of the selected portion of the hyper-graph structure;

comparing data stored in the at least one server corresponding to one commercial entity with data stored in the at least one server corresponding to another commercial entity, the data being compared comprising product data;

constructing a personal catalog from at least one recommendation for the particular customer according to the content in the selected portion of the hyper-graph structure and the comparison, for transmission to a device of the particular customer for viewing; and providing a graphical user interface that comprises one or more graphical elements that can be selected to organize and display the personal catalog according to the performed vertical analysis.

18. The method of claim 17, wherein the comparison is according to one or both of product pricing and product quality.

19. The method of claim 17, comprising comparing data stored in the at least one server corresponding to one commercial entity with data stored in the at least one server corresponding to another commercial entity, the data being compared comprising one or more of product data, a review, a blog, a video, a picture, an activity, a question, and an answer.

20. The method of claim 17, comprising:

generating an electronic message that comprises the recommendation; and tracking an interaction of the particular customer with the recommendation in the electronic message.

21. The method of claim 17, wherein the selected portion of the hyper-graph structure corresponds to a cohort of customers that comprises the particular customer.

22. The method of claim 17, wherein each of the customer data and the product data comprises data of different formats, the method comprising:

normalizing the customer data and the product data through abstraction and semantic generalization; and after normalization, storing the customer data and the product data into the hyper-graph structure.

23. The method of claim 17, comprising:

configuring the interconnections to dynamically connect at various levels of granularity and interpretation.

24. The method of claim 1, wherein the hyper-graph structure is maintained in a distributed in-memory cache to reduce retrieval latency.

25. The method of claim 1, wherein undocumented fields are indexed using a schema-less key-value store linked to hyper-graph nodes.

26. The method of claim 1, wherein imputation applies probabilistic graphical modeling.

27. The method of claim 1, wherein the GUI dynamically renders catalogs via a graph traversal visualization.

28. The method of claim 10, wherein normalization comprises mapping undocumented fields into latent semantic vectors.

29. The method of claim 10, wherein distributed graph partitioning is implemented via sharding across processing nodes.

30. The method of claim 10, wherein the hyper-graph structure supports query parallelization for real-time personalization.

31. The method of claim 10, wherein recommendations are cached in edge servers proximate to customer devices.

32. The method of claim 17, wherein comparison across commercial entities includes real-time sentiment data parsed from social media.

33. The method of claim 17, wherein edge weights in the hyper-graph are updated by reinforcement learning models.

34. The method of claim 17, wherein distributed memory caching is implemented using a time-based eviction policy.

\* \* \* \* \*